(12) United States Patent
Van Esbroeck et al.

(10) Patent No.: US 8,029,841 B2
(45) Date of Patent: Oct. 4, 2011

(54) MOULDING

(75) Inventors: Maurice Eduardus Theodorus Van Esbroeck, Bemmel (NL); Henricus Franciscus Jacobus Maria Van De Eerden, Gemert (NL); Petrus Christianus Marius Janssen, Wilbertoord (NL); Adrianus Josephes Van Den Nieuwelaar, Gemert (NL)

(73) Assignee: Stork PMT B.V. (NL)

( * ) Notice: Subject to any disclaimer, the term of this patent is extended or adjusted under 35 U.S.C. 154(b) by 0 days.

(21) Appl. No.: 12/555,185

(22) Filed: Sep. 8, 2009

(65) Prior Publication Data

US 2010/0055272 A1 Mar. 4, 2010

Related U.S. Application Data

(60) Division of application No. 11/758,567, filed on Jun. 5, 2007, now Pat. No. 7,597,549, which is a continuation of application No. 10/806,714, filed on Mar. 23, 2004, now Pat. No. 7,284,973, which is a division of application No. 09/863,933, filed on May 23, 2001, now Pat. No. 6,811,802, which is a continuation-in-part of application No. PCT/NL99/00701, filed on Nov. 16, 1999.

(30) Foreign Application Priority Data

Nov. 23, 1998 (NL) ..................................... 1010630

(51) Int. Cl.
*A23P 1/10* (2006.01)
(52) U.S. Cl. ......... 426/389; 264/335; 425/437; 426/513

(58) Field of Classification Search .................. 426/389, 426/512, 513; 425/362, 437; 264/335
See application file for complete search history.

(56) References Cited

U.S. PATENT DOCUMENTS

| 477,060 | A | 6/1892 | Nirdlinger |
| 713,570 | A | 11/1902 | Monroe |
| 859,999 | A | 7/1907 | Werner |
| 896,056 | A | 8/1908 | Colborne |
| 949,863 | A | 2/1910 | Traeber et al. |
| 1,487,812 | A | 3/1924 | Schreier |
| 1,678,747 | A | 7/1928 | Scholz |
| 1,803,408 | A | 5/1931 | Rouse |
| 1,964,969 | A | 7/1934 | Werner |
| 2,052,061 | A | 8/1936 | Toelke |
| 2,130,887 | A | 9/1938 | Kremmling |

(Continued)

FOREIGN PATENT DOCUMENTS

CA 2302915 12/2000
(Continued)

OTHER PUBLICATIONS

Search Report in related Application No. NL1010630 and its English Translation.

(Continued)

*Primary Examiner* — James Mackey
(74) *Attorney, Agent, or Firm* — Kilpatrick Townsend & Stockton LLP

(57) ABSTRACT

The invention provides methods for molding three-dimensional products from a mass of foodstuff which is suitable for human consumption, in particular from a mass of meat.
The method comprises feeding the mass of foodstuff into a mold cavity, molding the mass of foodstuff into a molded product, and removing the molded product from the mold cavity using pressurized gas.

1 Claim, 23 Drawing Sheets

U.S. PATENT DOCUMENTS

| | | | |
|---|---|---|---|
| 2,146,786 A | 2/1939 | Baker | |
| 2,354,000 A | 7/1944 | Craig et al. | |
| 2,600,222 A | 6/1952 | Donofrio | |
| 2,708,287 A | 5/1955 | Long et al. | |
| 2,774,313 A | 12/1956 | Lombi | |
| 2,949,713 A | 8/1960 | Vogt | |
| 3,050,017 A | 8/1962 | Mahler | |
| 3,137,029 A | 6/1964 | DeZolt | |
| 3,188,780 A | 6/1965 | Mead | |
| 3,205,837 A * | 9/1965 | Fay | 425/437 |
| 3,312,997 A | 4/1967 | Merrels | |
| 3,319,285 A | 5/1967 | Holly | |
| 3,427,649 A * | 2/1969 | Fay | 426/389 |
| 3,504,639 A | 4/1970 | Lilien | |
| 3,813,846 A | 6/1974 | Doering, Jr. | |
| 3,851,355 A | 12/1974 | Hughes | |
| 3,913,175 A | 10/1975 | Peterson | |
| 4,187,727 A | 2/1980 | Bhimji | |
| 4,193,167 A | 3/1980 | Orlowski et al. | |
| 4,212,609 A | 7/1980 | Fay | |
| 4,225,630 A | 9/1980 | Pitchon | |
| 4,433,621 A | 2/1984 | Van Wyk et al. | |
| 4,460,611 A | 7/1984 | Suzuki | |
| 4,571,924 A | 2/1986 | Bahrani | |
| 4,586,888 A | 5/1986 | Anderson | |
| 4,957,425 A | 9/1990 | Fay | |
| 4,975,039 A | 12/1990 | Dare et al. | |
| 4,987,643 A | 1/1991 | Powers et al. | |
| 5,250,314 A | 10/1993 | Jones | |
| 5,470,596 A | 11/1995 | Jones | |
| 5,536,517 A | 7/1996 | Hannaford | |
| 5,587,193 A | 12/1996 | Kazemzadeh | |
| 5,683,734 A | 11/1997 | Israel | |
| 5,752,364 A | 5/1998 | Benham et al. | |
| 5,846,588 A | 12/1998 | Zimmermann et al. | |
| 5,935,613 A | 8/1999 | Benham et al. | |
| 6,146,679 A | 11/2000 | Heyhoe | |
| 6,811,802 B2 | 11/2004 | van Esbroeck et al. | |
| 7,284,973 B2 | 10/2007 | van Esbroeck et al. | |
| 7,597,549 B2 | 10/2009 | van Esbroeck et al. | |
| 2007/0224306 A1 | 9/2007 | van Esbroeck et al. | |

FOREIGN PATENT DOCUMENTS

| | | |
|---|---|---|
| EP | 0447003 A1 | 9/1991 |
| EP | 0447003 B1 | 11/1995 |
| FR | 2440696 | 6/1980 |
| FR | 2491734 | 4/1982 |
| FR | 2538223 | 6/1984 |
| GB | 965468 | 7/1964 |
| GB | 2259043 | 3/1993 |
| WO | WO0030458 | 6/2000 |

OTHER PUBLICATIONS

International Search Report in related PCT/NL99/00701.
Office Action dated Oct. 30, 2002 in related U.S. Appl. No. 09/863,933.
Response dated Feb. 5, 2003 in related U.S. Appl. No. 09/863,933.
Office Action dated Jun. 5, 2003 in related U.S. Appl. No. 09/863,933.
Response dated Nov. 7, 2003 in related U.S. Appl. No. 09/863,933.
Notice of Allowance dated Dec. 23, 2003 in related U.S. Appl. No. 09/863,933.
Amendment after Final dated Mar. 25, 2004 in related U.S. Appl. No. 09/863,933.
Office Action dated Feb. 23, 2006 in related U.S. Appl. No. 10/806,714.
Response dated Mar. 21, 2006 in related U.S. Appl. No. 10/806,714.
Office Action dated May 25, 2006 in related U.S. Appl. No. 10/806,714.
Response dated Nov. 21, 2006 in related U.S. Appl. No. 10/806,714.
Office Action dated Mar. 2, 2007 in related U.S. Appl. No. 10/806,714.
Response dated May 31, 2007 in related U.S. Appl. No. 10/806,714.
Notice of Allowance dated Jun. 29, 2007 in related U.S. Appl. No. 10/806,714.
*Office Action dated May 30, 2008 in related U.S. Appl. No. 11/758,567.
*Response dated Oct. 30, 2008 in related U.S. Appl. No. 11/758,567.
*Office Action dated Nov. 28, 2008 in related U.S. Appl. No. 11/758,567.
*Response dated May 7, 2009 in related U.S. Appl. No. 11/758,567.
*Notice of Allowance dated May 26, 2009 in related U.S. Appl. No. 11/758,567.

* cited by examiner

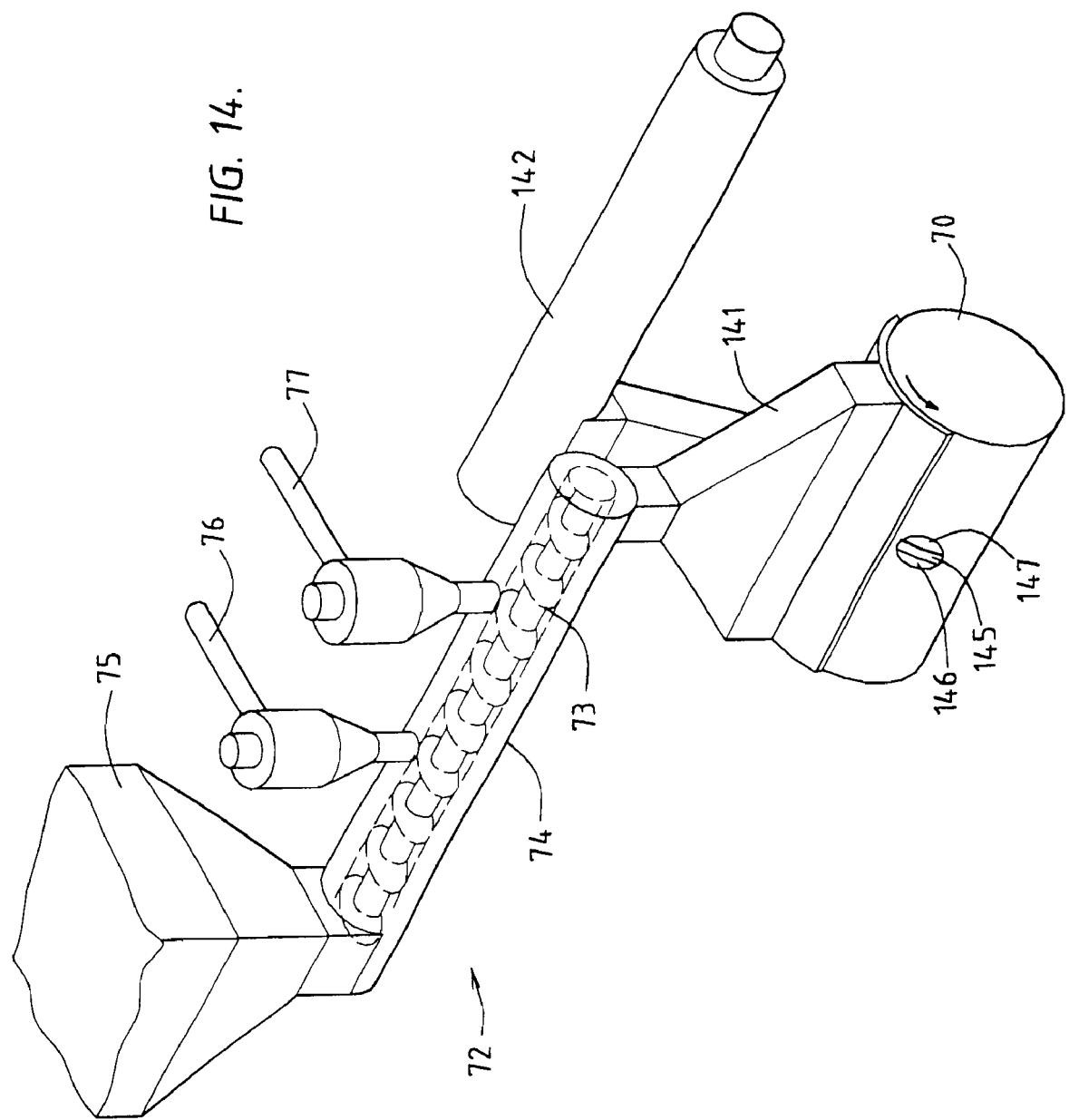

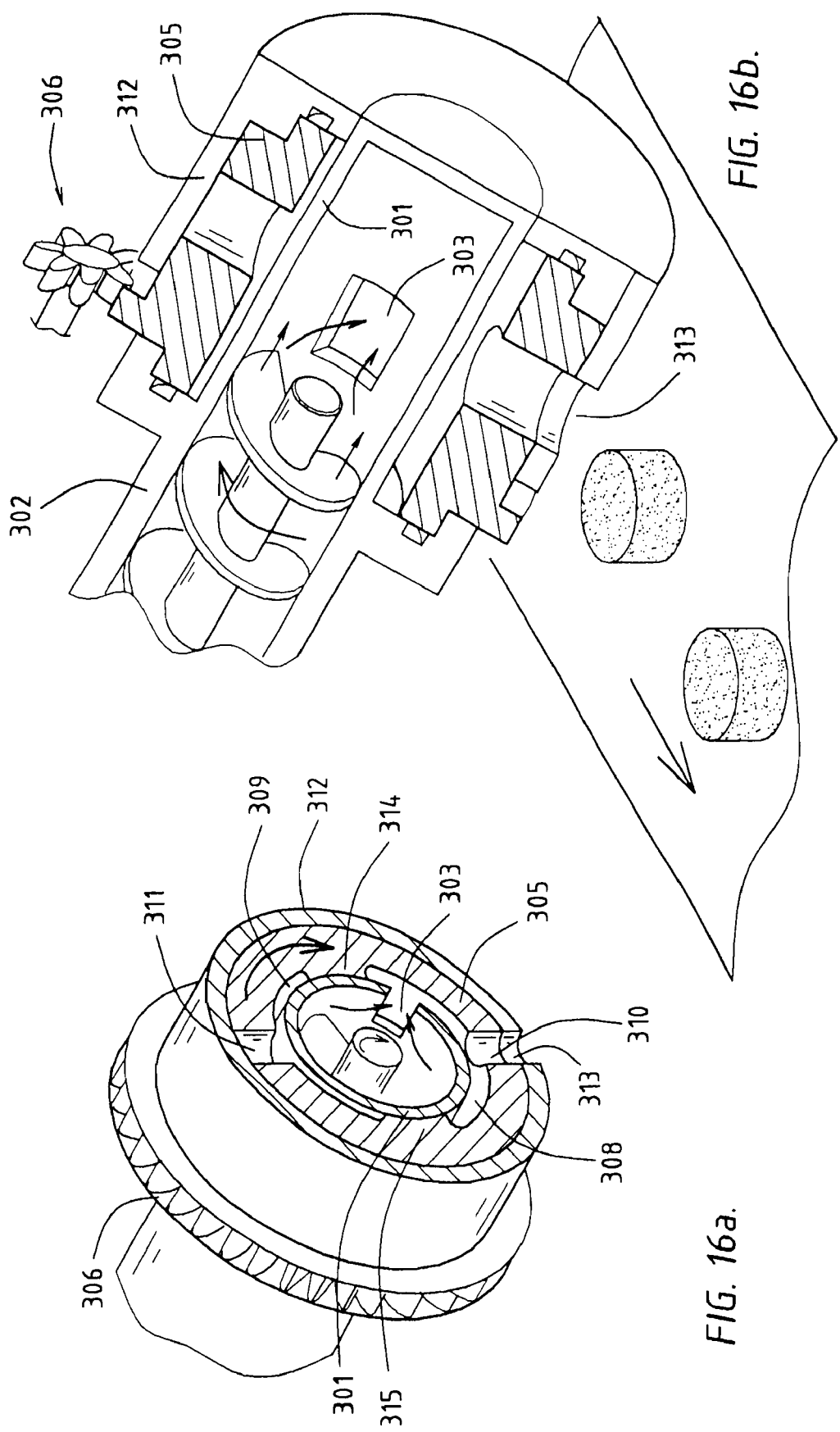

MOULDING

CROSS-REFERENCE TO RELATED APPLICATIONS

This is a division application of U.S. patent application Ser. No. 11/758,567 filed Jun. 5, 2007, which issued as U.S. Pat. No. 7,597,549 on Oct. 6, 2009, which is a continuation application of U.S. patent application Ser. No. 10/806,714, filed Mar. 23, 2004, which issued as U.S. Pat. No. 7,284,973 on Oct. 23, 2007, and which is a divisional application of U.S. Ser. No. 09/863,933, filed May 23, 2001, which issued as U.S. Pat. No. 6,811,802 on Nov. 2, 2004 and which is a continuation in part application of International Application No. PCT/NL99/00701 filed Nov. 16, 1999, which claims priority to Dutch Application No. 1010630 filed Nov. 23, 1998, the contents of all of which are incorporated by reference herein.

FIELD OF THE INVENTION

The present invention relates to the field of moulding three-dimensional products from a mass of foodstuff which is suitable for human consumption. In particular, the invention relates to the production of moulded portions of a foodstuff starting from a mass of the foodstuff in question, which mass is of substantially pasty, pulpy consistency. The invention relates in particular to the moulding of edible products from a mass which predominantly comprises pounded meat, in particular chicken or other poultry meat, but also beef, pork, etc. The invention also relates to the moulding of products from fish, dough, etc.

BACKGROUND OF THE INVENTION

With regard to the processing of poultry meat, the invention is based on the recognition that the processing of poultry produces low-quality meat, for example meat which has been mechanically removed from the bone and meat trimmings, which can be given a higher added value by being upgraded. Also, there is an increasing consumer demand for "moulded meat products", for example for snacks, and for meat products with an attractive appearance. In these sectors, demand may change quickly, so that it must be possible to adapt the production method according to the invention quickly to meet demand. Furthermore, it is observed that the demand for moulded (meat) products is very high, and consequently it must be possible to achieve a high production capacity.

Various methods and moulding machines are known for moulding products from a (meat) mass, and a number of these methods and moulding machines will be described briefly below.

U.S. Pat. No. 4,987,643 has described a moulding machine of the "slide-plate" type, for the purpose of producing portions of hamburger meat. A machine of this nature has a substantially planar moulding plate containing a plurality of mould cavities for the meat mass. The moulding plate can be moved to and fro substantially in its horizontal plane for the purpose of displacing the mould cavities between a filling position, in which the mould cavities are filled with meat mass which has been placed under pressure by a meat pump, and a removal position, in which the moulded meat products are removed from the mould cavity. The capacity of a slide-plate machine of this nature is limited in particular by the rate at which the mould plate can be moved to and fro; it is necessary for the mould plate of the known machine to come to a standstill at the filling and removal positions. The speed of movement of the mould plate is limited by the inertia forces which are generated by the heavy mould plate which is moving to and fro and the components which are connected thereto. The reciprocating movement is partly limited by the fact that the mass which is introduced into the mould cavity under a filling pressure has to remain in the closed mould cavity for a certain period in order to obtain the desired cohesion or adhesion of the pieces of meat. The design of these known moulding machines of the slide-plate type has proven unsuitable or, at any rate, disadvantageous for further increasing the production capacity, which would be desirable in view of the increasing demand for moulded meat products.

Another known type of moulding machine for meat products and the like is the "turret-type", an example of which is described in U.S. Pat. No. 4,193,167. In this type of moulding machine, the mould cavities are arranged on a horizontal rotating wheel which can be rotated about a vertical axle. The mould cavities have an opening on the underside of the rotary wheel, so that the mould cavities extend parallel to the axis of rotation of the rotary wheel. Opposite the opening of the mould cavity, this known moulding machine has a mechanically displaceable base, the movement of the base being derived, via a cam-disc mechanism, from the rotation of the rotary wheel. The operation of the associated filling device is synchronized with respect to the rotation of the rotary wheel. In this known moulding machine, the large number of and interaction between the moving components again limits the extent to which the capacity can be increased. Particularly when removing the moulded products, the adhesion of the meat mass to the side wall and the base of the mould cavity represents a problem for operating with success at high speed. The way in which the mould cavities are filled in this known machine also limits the production capacity.

Another type of moulding machine for moulding three-dimensional products from a meat mass or the like is the "rotating drum type". Known moulding machines of this type have a rotatable drum which is driven in continuous rotation by an associated drive, with a plurality of mould cavities on the outside of the drum, which cavities, in a filling position, move past a filling component which is arranged along the outside of the drum and by means of which the mould cavities are filled with (meat) mass. In a removal position, which is located further on in the direction of rotation of the drum, the moulded meat products are driven out of the mould cavities. In this type of machine, the mould cavities are located transversely with respect to the axis of rotation of the drum.

Examples of known moulding machines of the "rotating drum type" are described in U.S. Pat. No. 3,504,639, U.S. Pat. No. 3,851,355, U.S. Pat. No. 4,212,609, GB 2,259,043, FR 2,491,734 and FR 2,538223. The development of the moulding machine of this "rotating drum type" is currently not sufficiently advanced for achieving the production capacity required both currently and in the future, and consequently the abovementioned slide-plate moulding machines have the highest capacity and are used for mass production.

In the following text, it is assumed that a filling pressure is exerted on the (meat) mass which is to be introduced into the mould cavity in order to fill the mould cavity with a portion of the mass. Therefore, the filling pressure is the pressure which is exerted on the (meat) mass while the mould cavity is being filled.

In order to ensure that the (meat) pieces of which the mass consists adhere to one another, thus producing a dimensionally stable product, after the mould cavity has been filled with the (meat) mass, the mass has to be subjected to a fixing pressure for a fixing period which takes place at some point between the time at which the mould cavity is filled and the time at which the moulded product is removed and during which period the portion of the mass is enclosed in the mould cavity. After the fixing period, an edible product which forms a cohesive unit in a three-dimensional shape is obtained, which product can then be removed from the mould cavity.

In known moulding machines, such as for example the moulding machine which is described in EP 0,447,003, a portion of the mass is pressed into the open mould cavity by the filling component under a filling pressure. Then, the mould cavity is closed by the fact that the moulding plate with its mould-cavity opening slides away from under the opening of the filling component and moves under a closed top plate. Inevitable leakage from the mould cavity and/or relaxation of the mass in the mould cavity indicates that the pressure of the mass in the mould cavity falls slightly after the cavity has been closed. In the context of the present application, the pressure which then prevails in the closed mould cavity is regarded as being the fixing pressure. This fixing pressure remains present during the displacement of the mould plate until the mould cavity reaches the opening in the bottom plate, with the result that the mould cavity is opened to atmosphere. In this known moulding machine, the fixing pressure is therefore directly and exclusively related to the filling pressure, and it is impossible to control the fixing pressure independently of the filling pressure. Also, the duration of the filling period and the fixing period cannot be influenced independently of one another, since they are both determined by the displacement speed of the moulding plate of the moulding machine. A final drawback is that as soon as the opening in the bottom plate is reached, the mass in the mould cavity, which is still under pressure, immediately seeks to escape from the opening which is increasing in size, and this has an adverse effect on the shape of the product.

OBJECT OF THE INVENTION

One object of the invention is to provide measures which lead to a treatment of the mass when producing the edible products which is technologically optimum with regard to the (meat) mass which is to be processed.

A particular object of the invention is to provide measures which make it possible to control the fixing pressure largely, or preferably completely, independently of the filling pressure. As has been stated, the fixing pressure is one of the principal parameters of the moulding process. By providing devices which allow the fixing pressure to be controlled in this way, it is possible to optimally adapt the operation of each of the said devices to the (meat) mass which is to be processed by the device in question. Thus, there will be an optimum formula for each mass which is to be processed in order to mould products therefrom, and the perimeters of the formula will in principle comprise the time, the pressure and generally also the temperature. In known moulding methods, additives are often added to the edible mass which is to be processed in order in this way to allow the moulding process to proceed as desired, but this increases the cost price, and furthermore such additions are often deprecated by the consumer. For example, if an excessively high (filling and/or fixing) pressure is used or if a pressure is maintained on a (meat) mass for an excessively long period, there is a risk of fat and/or moisture being pressed out and/or of the components which form the mass becoming segregated. Furthermore, high pressures on the edible mass lead to design problems in the devices, such as at the seal which is required for the filling component.

It should be noted that the operation of filling the mould cavities, in particular the time involved in filling the mould cavities, is largely dependent on the filling pressure exerted on the mass. Independence of the filling pressure and fixing pressure allows the filling and moulding process to be set up optimally, partly with a view to achieving a high capacity of the device.

Furthermore, the methods and devices according to the invention make it possible to process numerous different masses, with the emphasis falling on the processing of meat masses.

A further object of the invention is to minimize the filling pressure. For example, in the method provided according to the invention, the filling pressure in the case of pounded meat is between 0.2 and 5 bar, and the fixing pressure is between 1 and 15 bar.

A further object of the invention is to provide measures which make it possible to reduce the mechanical load on the (meat) mass when a mould cavity is being filled compared to that which is employed in known moulding machines. This mechanical load is caused in particular by the filling pressure and by shear forces which are exerted on the meat mass, for example, when a stripper moves past the opening of the filled mould cavity. Excessive load on the meat mass damages the structure of the meat and therefore reduces the quality of the product. Furthermore, the shear forces exerted when a stripper of the like moves past may cause an undesirable change in the texture of the product.

A further object of the invention is to propose measures which make it possible to produce three-dimensionally moulded foodstuffs for human consumption with a high capacity. A particular object of the invention is to allow the moulding of the products to take place as far as possible in a continuous process, in which the mould cavities move along their path at a substantially constant speed and the filling and emptying of the mould cavities take place as far as possible on a continuous basis. A particular object of the invention is for the moulded products to be removed from the mould cavities without using mechanical ejectors, or with only minimal use of such ejectors.

Another object of the invention is to provide solutions for controlling the influence of the viscosity and other relevant properties of the (meat) mass which is to be fed to the mould cavities on the moulding of the product in the mould cavity. In particular, the invention provides for the preparation of the (meat) mass supplied in a continuous process, during which the (meat) mass can, for example, be cooled or heated and additives, such as water, spices, colorants and flavourings, egg whites, can be added.

Another object of the invention is to propose measures which make it possible to arrange differently shaped mould cavities on a moulding machine in a simple manner and in a short time, preferably without having to adapt the filling and/or removal system of the moulding machine. The invention also aims to make it possible to produce products of different shapes at the same time using a single moulding machine.

A further object of the invention is to propose measures which ensure a high level of hygiene during moulding of the products.

Another object of the invention is to propose measures for producing foodstuffs with a product body which is composed of a plurality of parts. This description encompasses, inter alia, layered products, products with an internal filling, etc.

A further object of the invention is to provide measures which allow the outside of the products to be treated, for example by the arrangement of a ribbed or grid pattern.

The invention also aims to provide a compact device.

A further object of the invention is to provide measures which allow the moulded products to be packaged efficiently.

SUMMARY OF THE INVENTION

The invention provides an improved method for moulding three-dimensional products from a mass of foodstuff which is suitable for human consumption, comprising the steps of:

filling a mould cavity with a portion of the mass via a filling opening which is associated with the mould cavity, under the influence of a filling pressure which is exerted on the mass and for a filling period, closing the filling opening of the mould cavity, holding the mass in the closed mould cavity for a fixing period, opening the mould cavity and removing the moulded product.

The improvement comprises the use of fixing-pressure-exerting means, which are designed to exert a fixing pressure which acts on the mass in the mould cavity after the filled mould cavity has been closed.

The invention furthermore provides devices for carrying out the method and other devices for moulding three dimensional products from a mass of foodstuff.

BRIEF DESCRIPTION OF THE DRAWINGS

FIG. 14 shows a variant on the design shown in FIG. 13.

FIGS. 16a and 16b show diagrammatic cross sections through a thirteenth exemplary embodiment of a moulding device according to the invention.

DETAILED DESCRIPTION OF THE INVENTION

Figure 1:
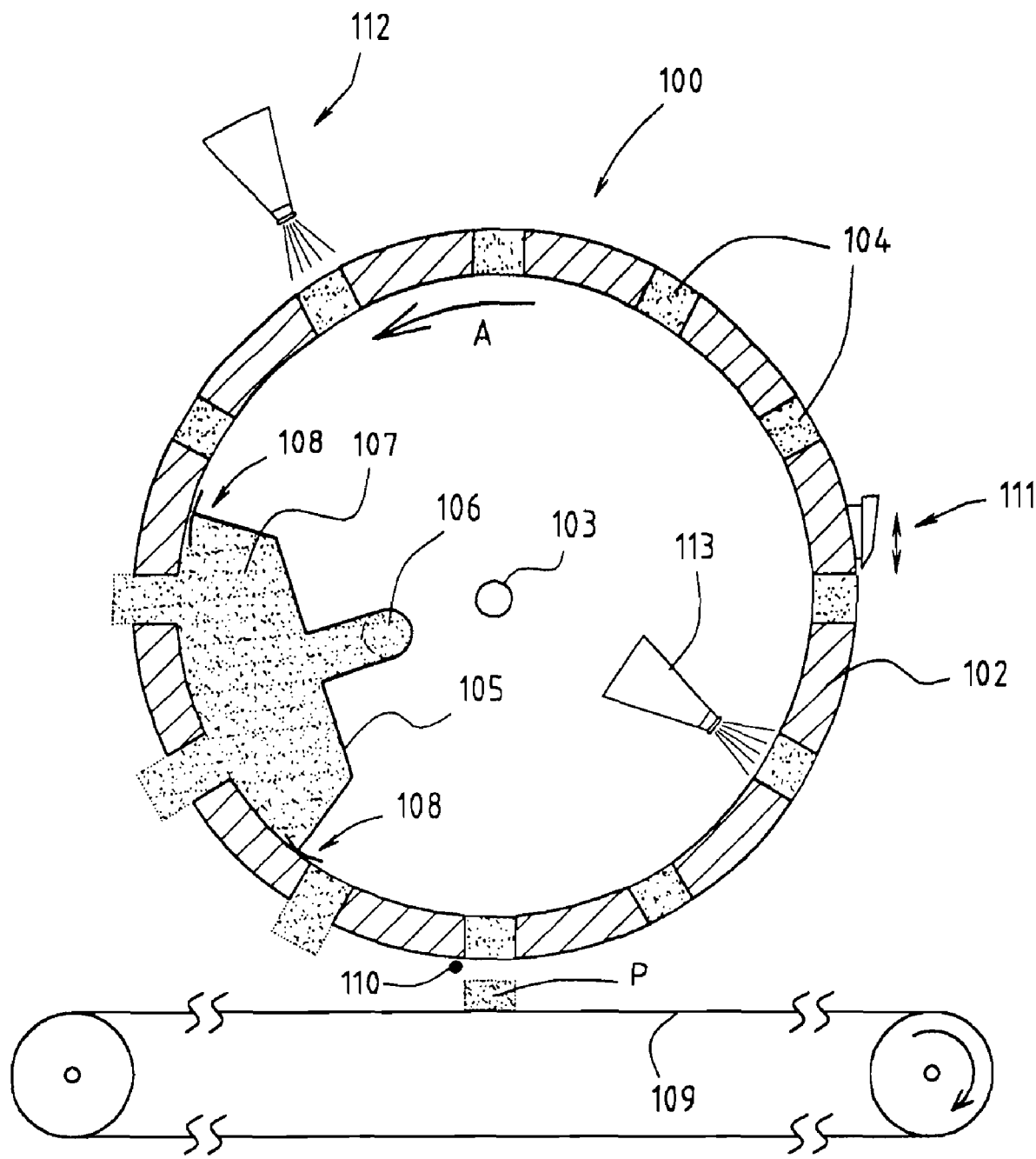
FIG. 1 shows a diagrammatic cross section through a first exemplary embodiment of a moulding device according to the invention.

FIG. 1 shows a first exemplary embodiment of a moulding device 100 according to the invention for producing edible products of three-dimensional shape from an inherently shapeless mass of foodstuff which is suitable for human consumption, in particular a mass of pounded (chicken) meat. The moulding device 100 is of the "rotating drum" type and comprises a rotatable drum 102 which, in an immobile frame (not shown), is mounted in such a manner that it can rotate about an axis of rotation 103, which in this example is substantially horizontal. The drum 102 is driven at a substantially constant rotational speed in a direction of rotation indicated by arrow A by drive means (not shown).

The drum 102 is provided with a plurality of mould cavities 104 which are distributed over the outer circumference and form openings which run all the way through the drum wall 102 and are thus open on both the outer circumference and the inner circumference of the drum 102.

In order to feed meat mass to the mould cavities 104, an immobile mass-feed or filling component 105 which bears against the inner circumference of the drum 102 is arranged at a mass-feed or filling position. The filling component 105 in this case comprises a connection piece 106 for an extruder or some other form of pumping/mixing device for supplying a pounded (meat) mass under pressure to a chamber 107 which is delimited by walls and has an opening along the inside of the drum 102. The walls of the chamber 107, at their edges which adjoin the drum 102, are provided with suitable sealing means 108, thus preventing meat mass from leaking out of the chamber 107.

It can also be seen in FIG. 1 that at least at the location of the filling component 105 the openings of the mould cavities 104 are not closed off on the outside of the drum 2. As a result, meat mass which is already present in the mould cavities 104 is pushed outwards, so that an outwardly projecting column of meat mass with a cross section which substantially corresponds to the cross section of the mould cavity 104 is formed at each mould cavity 104. Separating means, which separate a slice from the projecting column, preferably along the surface of the drum 102, are active at a removal position in the vicinity of the underside of the drum 102, above a moving belt 109 or some other conveyor mechanism for discharging the moulded products. In this example, a taut cutting wire 110 is arranged in a stationary position along the underside of the drum 102, which wire cuts off the moulded product "p", which then falls onto the belt 109. When this takes place, meat mass remains behind in the mould cavity 104, which meat mass is cut off when it moves past the cutting wire 110 one or more times. In a variant, there may be provision for the separating means to comprise an actuable separating component arranged on the outside of the drum 102 for each mould cavity 104, in order to cut off the outwardly projecting column of meat. This is diagrammatically indicated at 111 in FIG. 1.

Furthermore, there may be provision for one or more stations 112 to be arranged along the outside of the drum 102 for the purpose of treating the outer surface of the meat mass which is present in the mould cavities 104, for example for applying an additive to the said surface, for example breadcrumbs, a colorant or flavouring, etc. This operation could also, for example, involve applying a certain pattern to the meat mass.

There may also be provision for one or more stations 113 to be arranged in the interior of the hollow drum 102 for the purpose of treating the inner surface of the meat mass which is present in the mould cavities 104, for example for applying a layer which prevents or reduces adhesion to the meat mass which is subsequently to be placed into the mould cavity 104, so that the product "p" may come free from the meat mass which remains behind in the mould cavity at the removal position without the use of separating means. By way of example, a breadcrumb material could applied for this purpose.

Figure 2:
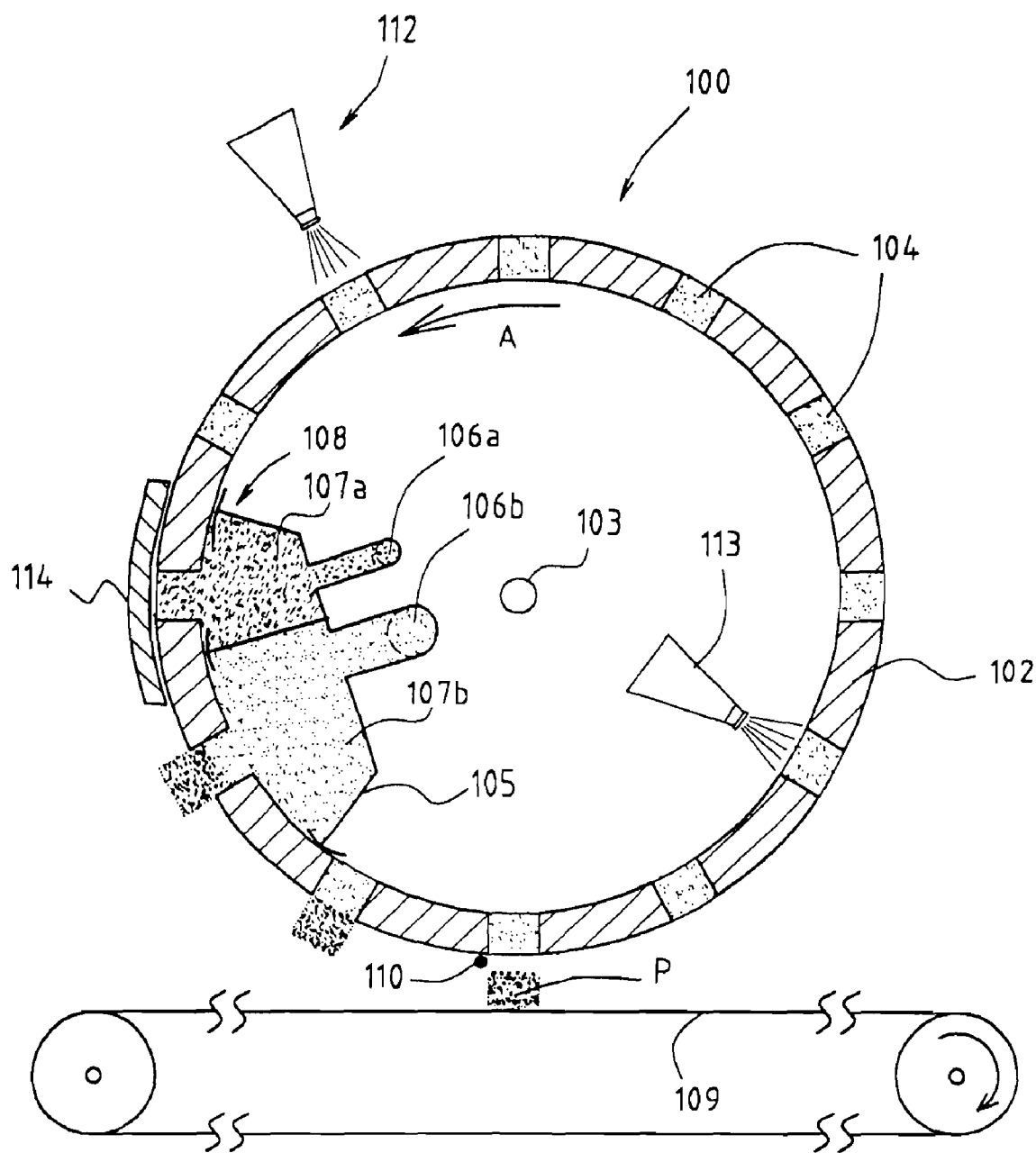
FIG. 2 shows a diagrammatic cross section through a second exemplary embodiment of a moulding device according to the invention.

FIG. 2 shows a variant on FIG. 1, and components which correspond to the components shown in FIG. 1 are denoted by the same reference numerals; for a description of how they operate, reference is made to the preceding text.

In FIG. 2, there is provision for a fixing pressure to be exerted on the meat in the mould cavities 104, and this is achieved by closing the mould cavities on one side by means of a closure component 114, which in this case bears against the outer circumference of the drum 102, and exerting a controllable fixing pressure on the meat mass in the mould cavity from the other side.

In this example, the chamber 107 of the filling component 105 is divided into two chambers 107a, 107b, each with an associated connection piece 106a, 106b, for example for an extruder belonging to each of the connections. The closure member 114 is arranged opposite the chamber 107a, on the outside so that a fixing pressure which provides the meat material with the desired cohesion can be generated in the chamber 107a. Then, in the chamber 107b, where the meat is subjected to a filling pressure which is lower than the fixing pressure, further meat material is pressed into the mould cavity 104, which is then open again on the outside. Given a suitable arrangement, only meat material which has been subjected to the fixing pressure and compressed is then separated at the separating position.

It will be clear that the closure member 114 may, as an alternative to the stationary plate shown here, also be a moving belt, as will be described below, and may also bear against a larger part of the drum, the same also applying to the chamber 107a. If appropriate, masses of different composition may be fed to the chambers 107a and 107b, resulting in a layered structure of the product p.

Figure 3:
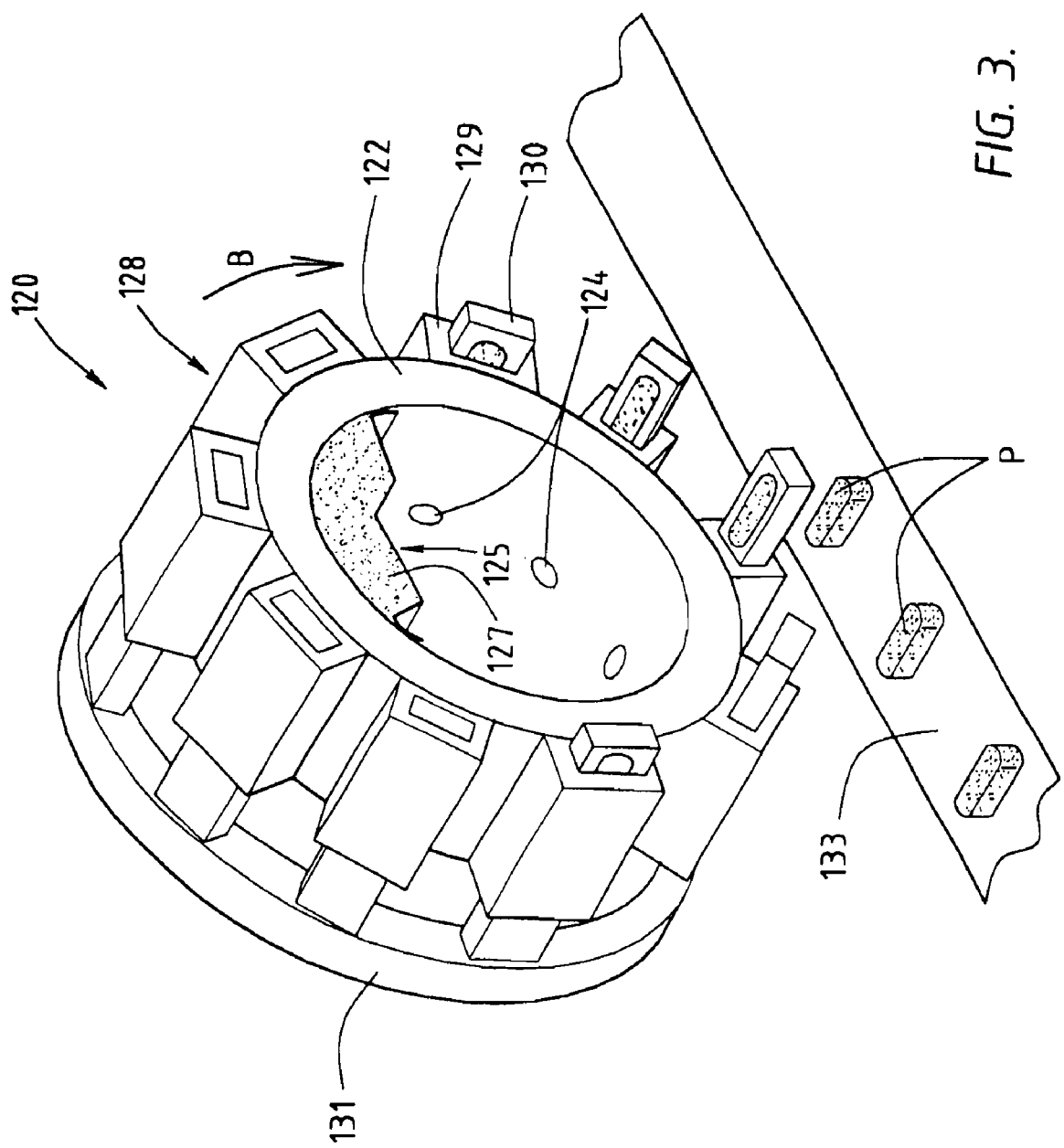
FIG. 3 shows a diagrammatic perspective view of a third exemplary embodiment of a moulding device according to the invention.

FIG. 3 shows a moulding device 120 with a drum 122 which can rotate about a substantially horizontal axis and is driven in the direction of arrow B by drive means (not shown). A filling component 125 with a wall which, together with the inner wall of the drum 122, delimits a chamber 127 to which a (meat) mass is fed in a manner not indicated, for example by means of an extruder, is located in a stationary position in the drum 122. The drum 122 is provided with continuous passages 124 which are distributed over the circumference and extend through the wall of the drum 122. A slideable moulding component 128 is arranged on the outside of the drum 122 for each passage 124. Each slideable moulding component 128 has a mould holder 129 which is arranged on the drum 122 and contains an opening for a sliding mould 130 which can be slid to and fro. In the retracted position of a mould 130, (meat) mass can be introduced into the mould 130 via the associated passage 124 when it moves past the filling component 125. Then, the mould 130 can be slid out of the associated holder 129, an operation which in this case is carried out by means of curved track 131, against which the moulds 130 bear under springloading or the like.

When the mould 130 has been sufficiently extended in the removal position at the bottom of the drum 122, the moulded product p falls out of the mould 130 onto the discharge belt 133. If appropriate, removal of the product p from the mould 130 can be assisted by means of compressed air or some other ejector means.

It will be clear that the filling component 125 may also be positioned along the outer circumference of the drum 122, with the sliding moulds 128 on the inside of the drum 122.

Figure 4:
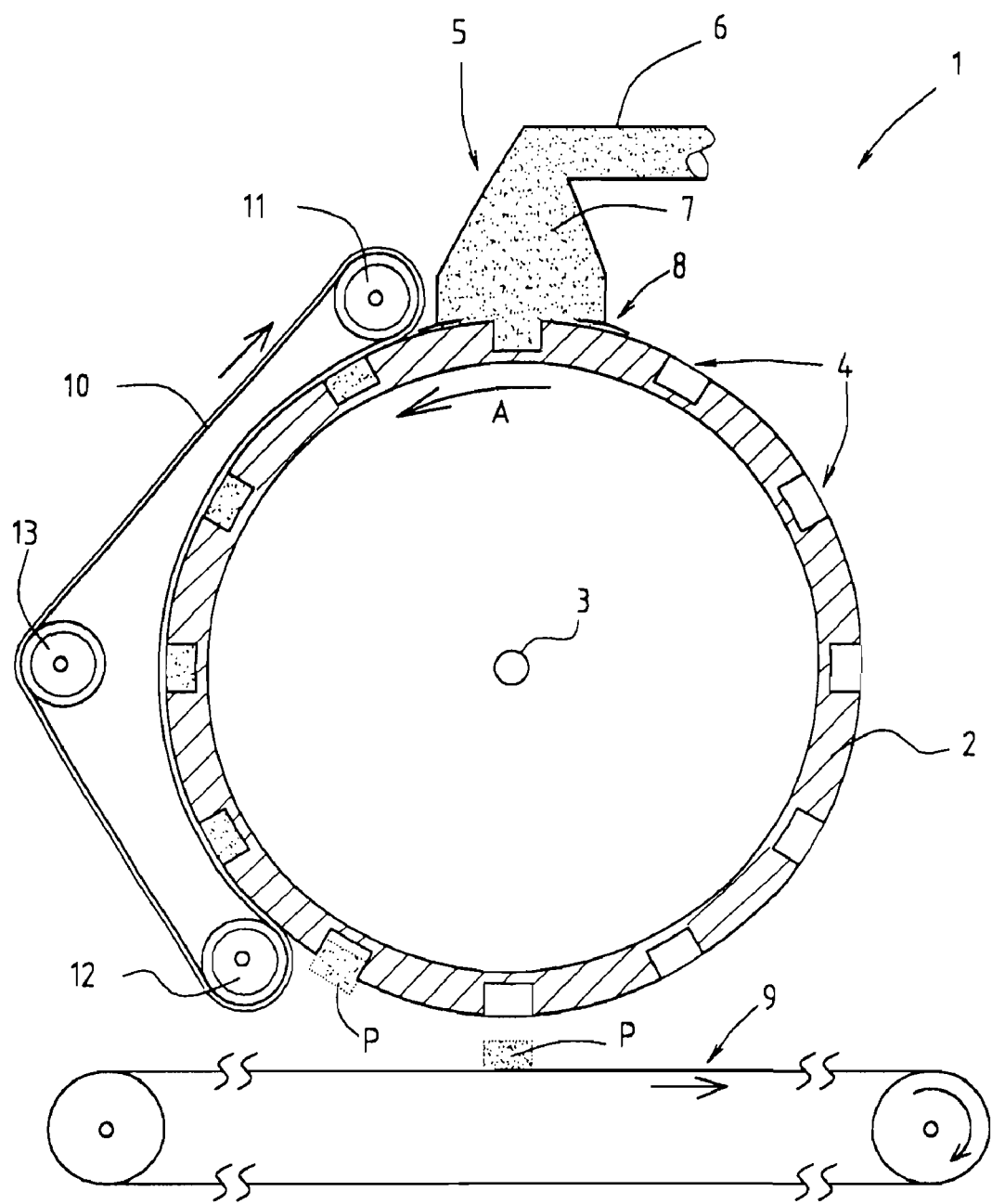
FIG. 4 shows a diagrammatic cross section through a fourth exemplary embodiment of a moulding device according to the invention.

FIG. 4 shows a fourth exemplary embodiment of a moulding device 1 according to the invention for moulding three-dimensional products from a mass of foodstuff which is suitable for human consumption, in particular a mass which predominantly consists of pounded (chicken) meat. The moulding device 1 is of the "rotating drum" type and comprises a rotatable drum 2 which, in a stationary frame (not shown), is mounted in such a manner that it can rotate about an axis of rotation 3, which in this case is substantially horizontal. The drum 2 is driven, preferably at a substantially constant rotational speed, in a direction of rotation which is indicated by arrow A, by drive means (not shown).

The drum 2 has a substantially cylindrical drum wall with a diameter which is, for example, between 0.15 and 0.7 meter and a length which is, for example, between 0.3 and 2 meters. The considerable length of a drum 2 of this nature is possible in particular because of the tubular shape of the drum 2, which tubular shape is very stable with respect to the forces which are generated during the moulding process. These forces, which are generated in particular by the filling pressure with which the mass is pressed into the mould cavities and the fixing pressure, in principal cause the drum 2 to bend, which causes problems in particular for seals which bear against the inside and/or outside.

Preferably, the drum 2 is formed from a metal tube which is commercially available as standard, but it will be clear that the drum 2 may also be assembled from sections or, for example, from a special casting. The drum may also be provided with internal reinforcements, for example reinforcement plates which are located at axial distances from one another.

The drum 2 may also be formed by a plurality of tubes which slide into one another, which structure is advantageous for the arrangement of connecting passages, in particular for compressed air and/or vacuum, which lead to the mould cavities 4. These passages could then be arranged substantially as grooves in the walls of the said tubes.

The bending can be reduced by providing the drum 2 with prestressing means which generate an axial prestress in the drum wall and thus reduce any bending. The bending can also be reduced by making use of one or more robust support rollers which bear against the drum wall, for example in the interior of the drum opposite the filling device 5, in order in this way to absorb the forces which the filling pressure exerts on the drum 2.

The drum 2 is provided with a plurality of mould cavities 4 which are distributed over the outer circumference and are open on the outer circumference of the drum 2. By way of example, the mould cavities 4 are arranged in a pattern with a plurality of circumferential rings, located next to one another in the longitudinal direction of the drum 2, of similar mould cavities. There may also be provision for the mould cavities in each ring to be distributed at equal angular intervals around the circumference of the drum, in which case the mould cavities of adjacent rings are always offset in the circumferential direction. Such an arrangement of the mould cavities leads to mould cavities being filled virtually continuously, instead of groups of mould cavities being filled simultaneously, with a time gap between filling operations. This manner of continuous filling, particularly with a continuous supply of mass to the filling component, for example by an extruder, leads to a uniform filling pressure. This arrangement will also deliver a continuous stream of moulded products.

Obviously, it is also conceivable for mould cavities 4 of different shapes to be arranged on the drum 2. In this case, the mould cavities may be of any conceivable form, for example circular or rectangular, but also in novelty shapes, such as in the shape of a Christmas tree, a crescent, a star, a triangle, etc. In an advantageous embodiment, one or more mould cavities may form part of a removable mould which can be releasably attached to the drum. This may, for example, be achieved by providing the drum 2 with a large number of identical holding features around its outer circumference, for example openings arranged in the drum wall and/or coupling means positioned on the outer circumference, a mould fitting into each holding facility, in which case a large number of moulds belong to the moulding machine and are identical insofar as they can be positioned on the drum by means of the holding facilities, but have mould cavities of different designs.

If different mould cavities 4 are arranged on the drum 2, it is possible, by selecting a suitable arrangement of the said mould cavities 4, to ensure that the differently shaped products do not have to be handled, or scarcely have to be handled, during subsequent processing. For example, it is conceivable to produce sets of three products of different shapes and to supply these sets in a single pack. In this case, it may be advantageous for the three different mould cavities to be arranged next to or immediately after one another on the drum, so that the products are delivered by the moulding device in sets of three.

As an alternative to the drum, it is also possible, albeit with a higher level of technical complexity, to provide for the moulds, each with one or more mould cavities therein, to be arranged on a common turret which defines a loop-like movement path for the moulds, in which case drive means are provided, which move the moulds along the movement path. Preferably, in this case, the drive means move the moulds at a substantially constant speed along the movement path. The loop-like movement path may in this case be a circle, as with the drum, but other forms are also easy to achieve in practice, such as for example a path with two straight sections which are connected at their ends via 180° bends.

To feed a portion of meat mass to the mould cavities 4, a stationary mass-feed or filling component 5, which bears against the outer circumference of the drum 2, is arranged in a mass-feed or filling position, in this case in the vicinity of the top side of the drum 2. The filling component 5 in this case comprises a connection piece 6 for an extruder or some other form of pump device for supplying the meat mass under pressure to a chamber 7 which is delimited by walls and has an opening on the side of the drum 2. At their edges which adjoin the drum 2, the walls of the chamber 7 are provided with suitable sealing means 8, making it possible to prevent meat mass from leaking out of the chamber 7. The filling component 5 shown is in fact intended to completely fill the mould cavity. In another embodiment (not shown), the filling component may also be designed to feed a predetermined portion to the mould cavity, for example on the basis of the volume and/or mass of the portion, the volume of which portion may therefore be smaller than the volume available in the mould cavity. For example, a filling component of this nature moves a slice or other preformed shape of the foodstuff which is to be processed into the mould cavity.

It can also be seen from FIG. 4 that the moulded products "p" are removed from the mould cavities 4 at a removal position, in this case in the vicinity of the underside of the drum 2, above a conveyor belt 9 or other conveyor mechanism for discharging the moulded products. This ejection may be effected by the force of gravity, as illustrated in FIG. 4, but owing to the adhesion of the meat mass to the walls of the mould cavities 4, the removal is preferably facilitated or assisted in ways which are to be described in more detail below.

The filling component 5 ensures that a portion of the meat mass is moved into a mould cavity 4 at a defined filling pressure. To obtain firm cohesion between the pieces of meat, so that ultimately a stable product is obtained, it is necessary, after the mould cavity 4 has been filled, to exert a fixing pressure on the meat mass for a defined period. For this purpose, there is provision for the filling openings, which are located on the outside, of the mould cavities 4 to be closed off over at least part of the path between the filling component 5 and the removal position, preferably over virtually the entire path.

In this case, the mould cavities 4 are closed off with the aid of a flexible belt 10 which, in the path in question, bears against the outer circumference of the drum 2 and preferably moves with the drum 2. The belt 10 runs around a top roller 11, which is arranged in the vicinity of the filling component 5 or even, with the belt 10 wrapped around it, forms part of the walls of the chamber 7 of the filling component 5. In the vicinity of the removal position, the belt 10 runs around a bottom roller 12 and also runs around a tensioning roller 13 which supports the return section of the belt 10. If appropriate, a separate drive for the belt 10 may be provided. It is also possible to provide cleaning means which clean the belt 10 in its return section.

Closing the mould cavities 4 with the aid of the belt 10 bearing against the drum 2 ensures that the meat mass in the mould cavities 4 is placed and held under a fixing pressure, with the result that the desired cohesion and mutual adhesion of the (meat) pieces is obtained. In the embodiment shown in FIG. 4, the fixing pressure is obtained by the fact that the convex side of the mass which is produced at the filling component 5, is, as it were, pressed flat into a mould cavity 4 by the belt 10, with the result that the mass is placed and held under a fixing pressure in the closed mould cavity 4 throughout the time during which the belt 10 closes off the mould cavity 4.

The device shown in FIG. 4 also allows the outside of the moulded product to be treated, in particular along the path between the location where the outside is no longer covered by the belt 10 and the moment at which the product is ejected. For example, a spraying device could be used to apply a layer to the product. As soon as the product rests on the discharge belt, the other side could also be treated.

Figure 5:
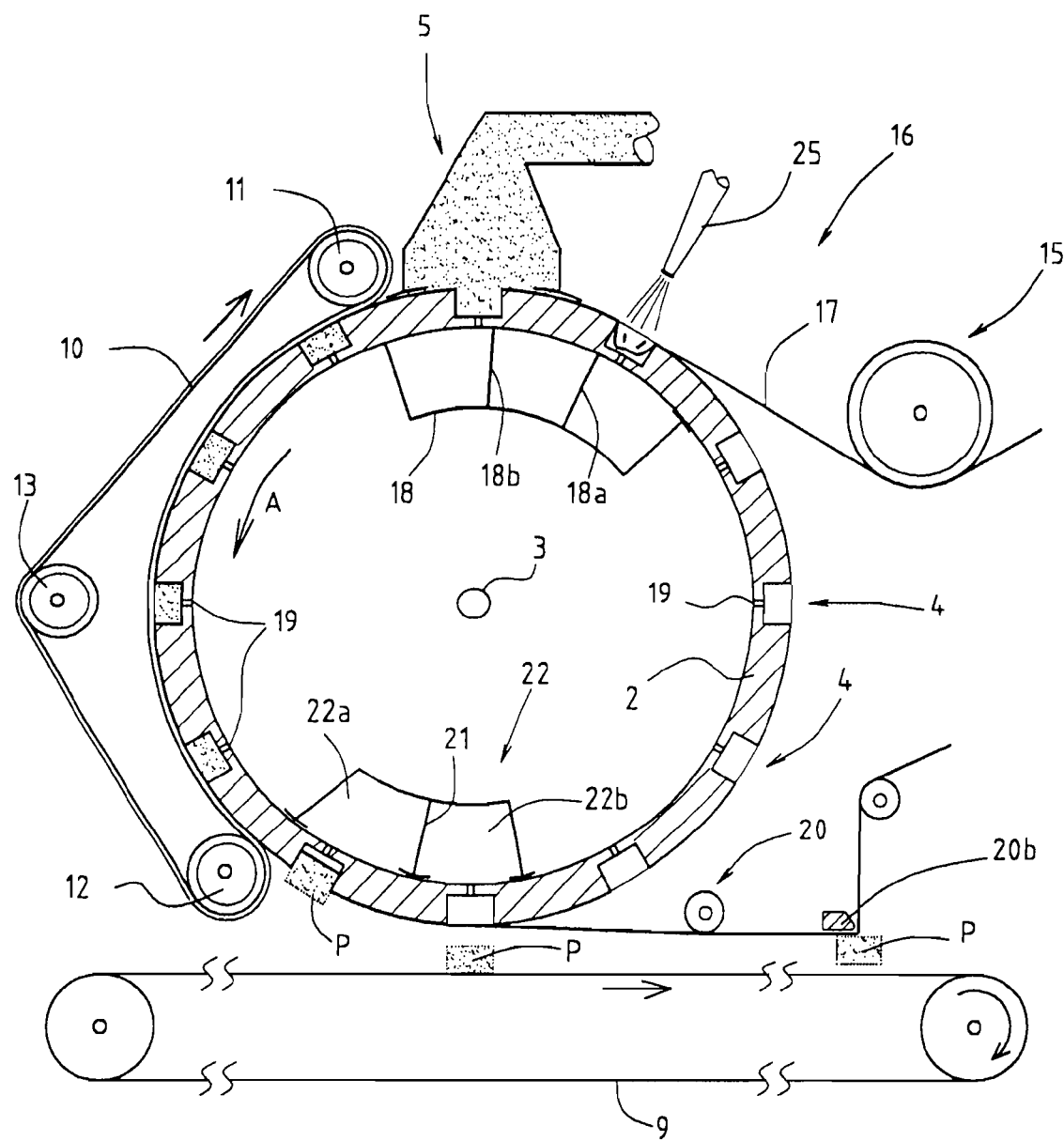
FIG. 5 shows a diagrammatic cross section through a fifth exemplary embodiment of a moulding device according to the invention.

FIG. 5 shows a fifth exemplary embodiment of a moulding device according to the invention. Where components correspond to the components shown in an embodiment described above, these components are denoted by the same reference numerals; reference is made to the preceding text for a description of how they function.

In FIG. 5, reference 15 denotes a film-feed mechanism for feeding film. This preferably thin, flexible (plastic) film 17 is placed against the outside of the drum 2 at a film-placing position 16, which is upstream of the filling component 5, as seen in the direction of rotation, and serves to ensure that at least the walls and the base of the mould cavities 4 are covered by the film 17.

To ensure that the amount of film 17 present at each mould cavity 4 of the device is such that this film 17 is able to bear taut against the base and the side wall of the mould cavity 4 when the meat mass is introduced into the mould cavity 4, vacuum means are provided here, which, between the film-placing position 16 and the filling component 5, remove air from the mould cavity 4 which is covered by film 17. The vacuum means in this case comprise a tray 18 which is arranged in a stationary position in the rotating drum 2 and is formed by a wall which in part lies at a distance from the inside of the drum and at its edges bears in a sealed manner against the inside of the drum 2, so that a closed space which is delimited by the wall of the tray 18 and the inside of the drum 2 is formed. This closed space is connected to a vacuum pump or the like, so that a reduced pressure can be generated in the tray 18. Furthermore, the drum 2 is provided at each mould cavity 4 with a connecting passage 19 which connects the mould cavity 4 to the inside of the drum 2, so that at the moment at which a mould cavity 4 reaches the tray 18 air is sucked out of the mould cavity 4 via the associated passage 19, while the opening of the mould cavity is already covered by the film 17 on the outside of the drum 2. Partly because of the appropriate flexibility of the film 17, the film 17 matches the shape of the mould cavity 4. In this example, this suction on the film 17 is maintained until the filling component 5 fills or has filled the mould cavity 4.

The film 17 prevents the meat mass from sticking to the drum 2, which is particularly relevant for removal of the moulded product and also prevents contamination to the drum 2. Furthermore, the film 17 can be used to eject the moulded product from the mould cavity 4, for example by exerting a pulling force on the film 17 in the vicinity of the removal position, an operation which can be achieved, for example, by (temporarily) rapidly rotating a pulling roller 20 against which the film 17 bears, thus exerting tension on the film 17.

If the product p sticks to the film 17, it is preferable to guide the film 17 through a sharp bend, for example around bar 20b, so that the film 17 moves into a position in which it is approximately at right angles to the surface of the product and is thus stripped off from the surface of the product.

The passages 19 may also be used to eject the moulded product by introducing compressed air into the mould cavity 4 beneath the film 17 via the said passages 19 at the removal position. This may be effected using excess-pressure tray 22, which is positioned in the drum 2 in the vicinity of the removal position. The tray 22 is arranged in a stationary position and bears in a sealed manner against the inside of the drum 2, and is connected to a compressor (not shown) for feeding pressurized air (or another gas) to the tray 22, with the result that the product and the film 17 are pressed out of the mould cavity 4. If appropriate, there may be provision for the tray 22, as seen in the direction of rotation of the drum 2, to be divided into a plurality of compartments 22a, 22b by means of one or more partitions 21, in which case the gas pressure can be adjusted separately in each compartment 22a, 22b. This makes it possible to successfully control the ejection of the moulded product. Incidentally, the same measure may also be used for the reduced-pressure or suction tray 18.

In a variant which is not shown, there may be provision for a medium to be pressurized in the mould cavities 4 via the passages 19 in the path in which the mould cavities 4 are closed off on the outside by the belt 10. This may, for example, be achieved by arranging an excessive-pressure tray, corresponding to tray 22, which is divided into one or more compartments at that location but on the inside of the drum 2. Then, by suitably regulating the pressure of the medium, it is possible to control the fixing pressure in the mould cavities 4. The mould cavities 4 may, for example, be designed in the manner which will be explained in more detail below with reference to FIGS. 11, 12a and 12b.

The film 17 is, for example, disposable and is guided onto a reel and wound up after it has run around the drum, after which a reel of used, dirty film is removed and destroyed. However, the film 17 could also be used for packaging the product.

FIG. 5 also shows a station 25 which is arranged along the outside of the drum 2, between the film-placing position 16 and the filling component 5. The station 25 may, for example, be used to apply a coating or the like to the film 17. This coating may be in a wide variety of forms, for example may be a liquid substance which influences the adhesion between the meat and the film 17, or an edible coating which is intended to influence the appearance of the outer layer of the moulded product, for example a coating containing breadcrumbs and an egg-white emulsion, a colorant or flavouring etc. The station 25 may comprise liquid sprayers and/or atomizers, which only operate when a mould cavity 4 covered by film 17 moves past, and/or a fan or other blowing device for blowing more or less solid edible particles, for example edible flakes, onto the film, which may previously have been moistened.

In a variant on the device 1 described above, the reduced pressure acting on the film 17 is eliminated after it has been sucked under vacuum into the mould cavity 4, before the filling device 5 is reached, so that the film 17 is again approximately in the plane of the opening of the mould cavity 4. The aim of this is to ensure that the meat mass bears against the film 17 without the inclusion of air in the vicinity of the filling device 5 and moves into the mould cavity 4 together with the film, during which operation, if appropriate, reduced pressure is again exerted via passage 19. This procedure can be achieved by providing the tray 18 with the partitions 18a, 18b as shown in FIG. 5.

It should be noted that the step of firstly sucking the film 17 into the mould cavity 4 before the filling device 5 is reached is important in order to ensure that sufficient film material collects at the location of the mould cavity 4. If the film 17 were to be in a taut position above the opening of the mould cavity 4 when the mould cavity is being filled, it is impossible, or virtually impossible, to feed film material when the meat mass is pressed into the mould cavity 4, so that a very high level of elasticity of the film 17 would be necessary in certain areas, in particular around the edge of the mould cavity 4.

To avoid air being enclosed between the film 17 and the meat mass, use could also be made of steam or another condensable gas. In that case, a steam tray, for example, would be placed against the outside of the drum, immediately upstream of the filling component 5. Consequently, steam will be included between the film and the meat mass, but this steam will rapidly condense to form a minimal quantity of water.

As an alternative, it is possible for the belt 9 to be covered with a film which moves with it and onto which the products fall. This film could then, for example, form part of the packaging for the products.

Figure 6:
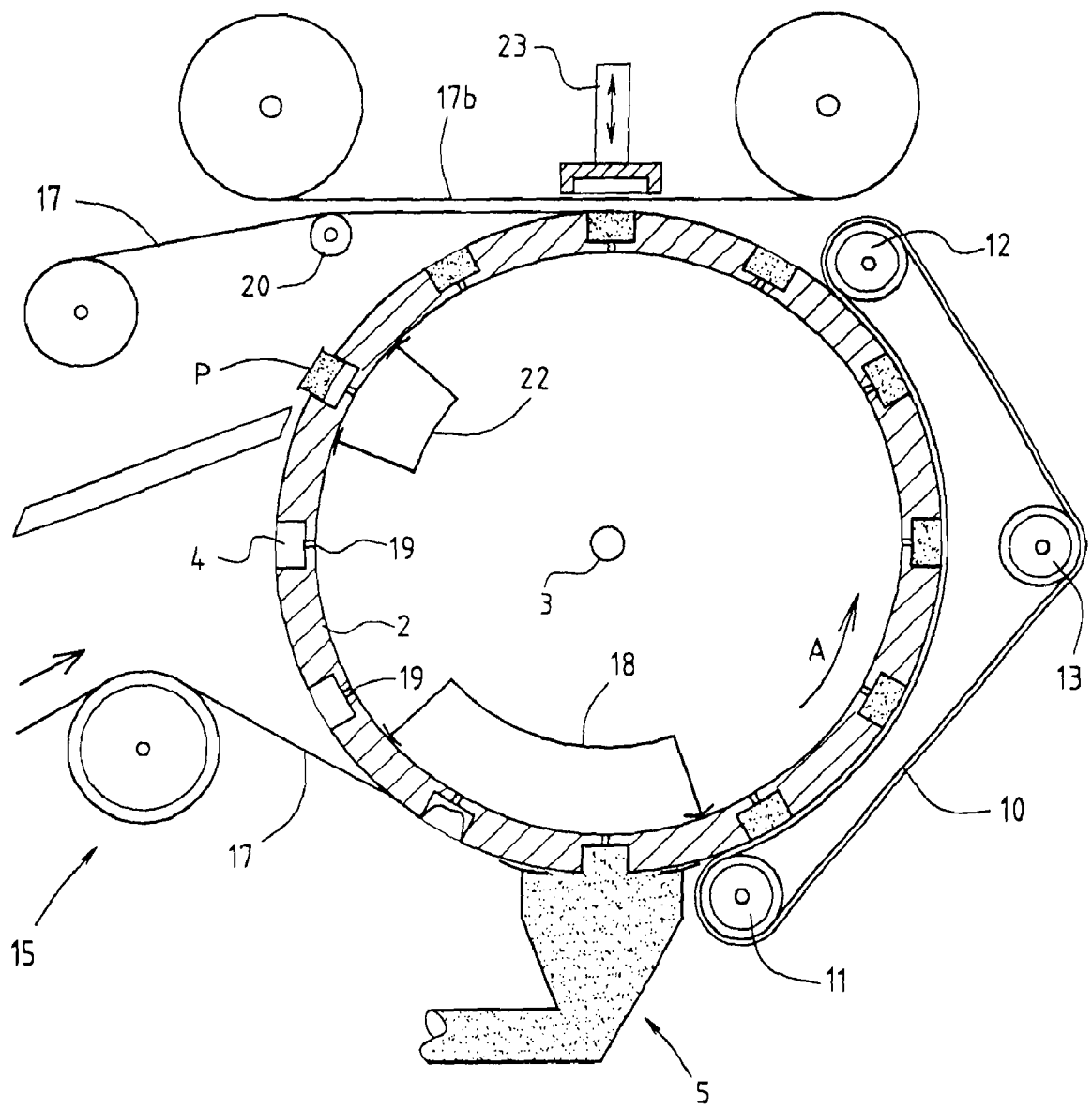
FIG. 6 shows a diagrammatic cross section through a sixth exemplary embodiment of a moulding device according to the invention.

FIG. 6 shows a variant on the device shown in FIG. 5, in which the principal change is that the device is positioned upside-down. Consequently, the filling component 5 is now located in the vicinity of the underside of the drum 2. A second web of film 17b is fed to the top side and is guided over the drum 2, so that the moulded products, which are still enclosed in the mould cavities 4, are enclosed between the two films 17 and 17b.

In this example, a film-welding device 23 is also arranged in the vicinity of the top side of the drum 2, which film-welding device welds the two layers of film 17, 17b together, for example around each cavity 4, so that the product is packaged in film while it is still inside the mould cavity. If appropriate, the film layers 17, 17b are cut or melted through around the outside of the weld, so that the product enclosed in film is detached from the two layers of film. The product which is packaged in film is then discharged by means of the excess-pressure tray 22 or some other removal mechanism. Obviously, it is conceivable that the product will be enclosed between the two film webs 17, 17b only at a later stage, after the products lying on the film 17 have been removed from the mould cavities 4 of the device. The separation of the products which are packaged in film from the film webs may also take place at a later stage, so that the film webs can still be used as a mechanism for conveying the packaged products. One advantage of the device shown in FIG. 6 is the height at which the products are removed, which makes it easy to provide connection to subsequent stations.

Figure 7:
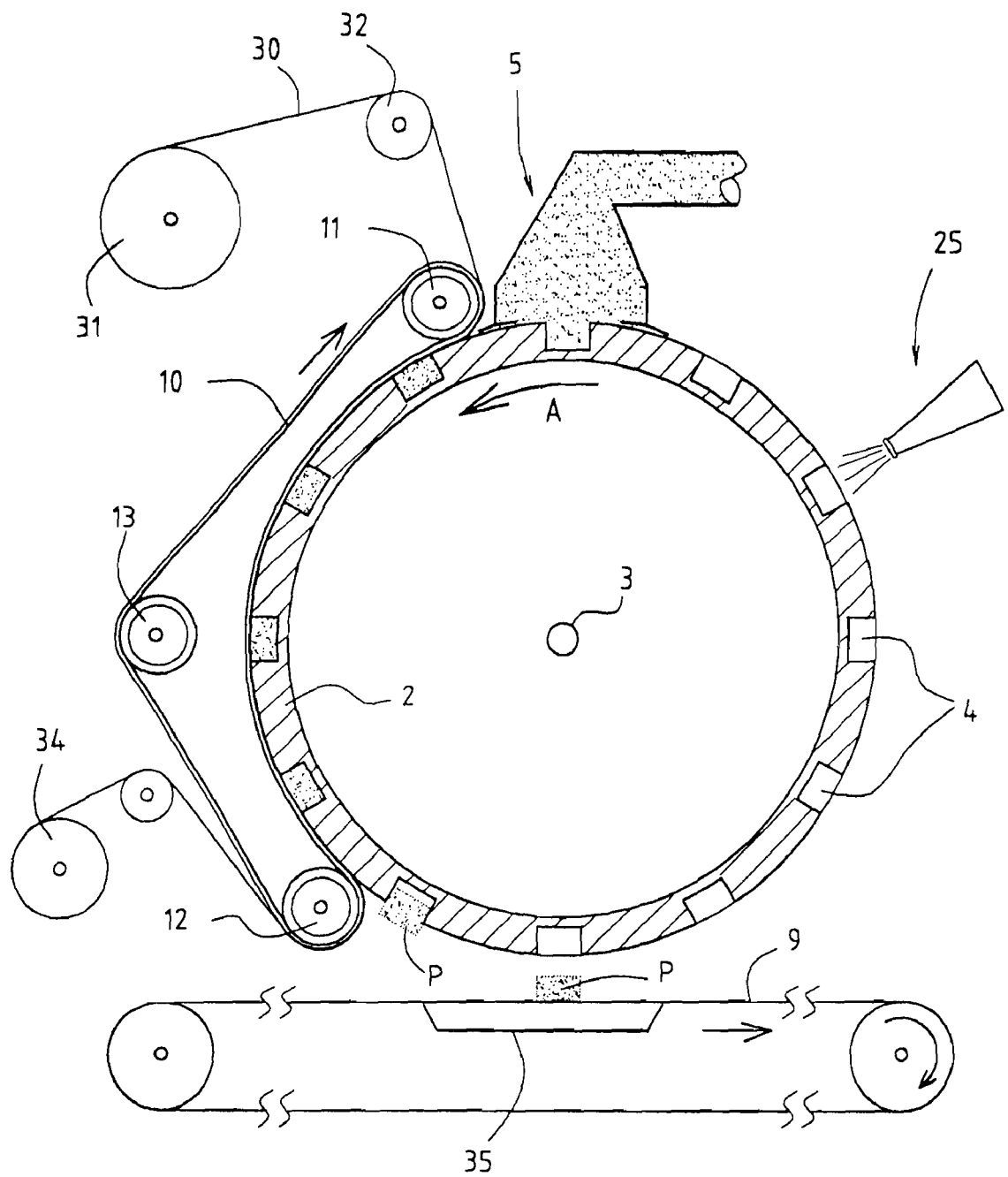
FIG. 7 shows a diagrammatic cross section through a seventh exemplary embodiment of a moulding device according to the invention.

FIG. 7 shows a seventh exemplary embodiment of a moulding device according to the invention. Where components correspond to the components shown in an embodiment which has been described above, these components are denoted by the same reference numerals; reference is made to the preceding text for an explanation of how they function.

In FIG. 7, there is provision for a film 30 to be placed between the belt 10 and the drum 2, which film 30 moves with the drum 2 and the belt 10. This measure allows the film 30 and the belt 10 each to have different properties which are adapted to their specific tasks. In particular, the film 30 in this case serves as a protection for protecting the belt 10 from the (meat) mass in the mould cavities 4, so that the belt 10 does not come into contact with the (meat) mass and is therefore not contaminated and also does not have to be cleaned.

In this example, the film 30 is intended for single use and is supplied from a supply reel 31 and then runs around the top deflector roller 11 of the belt 10 via guide roller 32. In this example, the film 30 also runs around the bottom deflector roller 12 of the belt 10 and is then separated from the return section of the belt 10 via guide roller 33 and is wound onto a discharge reel 34. However, it is also possible for the film 30 to remain in position against the products when the moulded products are ejected and to be used to discharge the products, and if appropriate even for handling the moulded products in further processing devices and/or for packaging the products.

For example, it is possible for the conveyor 9 to be provided with openings in its belt and for a reduced-pressure tray 35 to be positioned beneath the belt 9 in the vicinity of the ejection position of the products, so that the film 30 can be sucked onto the belt 9 and can be moved with the belt 9. In this case, the products continue to lie on the film 30. This has the advantages that the conveyor 9 is not contaminated, that the moulded product is supported when it is ejected from the drum, and that the position of the product on the film 30 is fixed, which may be advantageous for any subsequent processing operations.

In a variant which is not shown, the film 30 is also designed as an endless loop, i.e. in the same way as the belt 10, in which case, for example, there is provision for the film 30 to be cleaned. Incidentally, in these illustrations, the film is always shown and described as being considerably thinner than the belt, although it is equally conceivable for the components described as film and belt to be of similar thickness.

FIG. 7 also shows the station 25 with which, for example, the mould cavities 4 can be cleaned before they are refilled. If appropriate, a non-stick agent may also be arranged in the mould cavities 4, or some other means may be provided, such as that illustrated in FIG. 5. Obviously, the devices shown in FIGS. 5, 6 and 7 can also be combined to form a single device, in which the portions of meat mass in the mould cavity 4 are completely surrounded by the two films 17 and 30.

In a further variant, the discharge belt 9 with the tray 35 bears against the drum 2 and the belt 9 is moved at the same speed. As a result, the product is, as it were, sucked firmly onto the belt 9 while it is still in the mould cavity 4, and then the product is gradually removed from the mould cavity.

Figure 8:
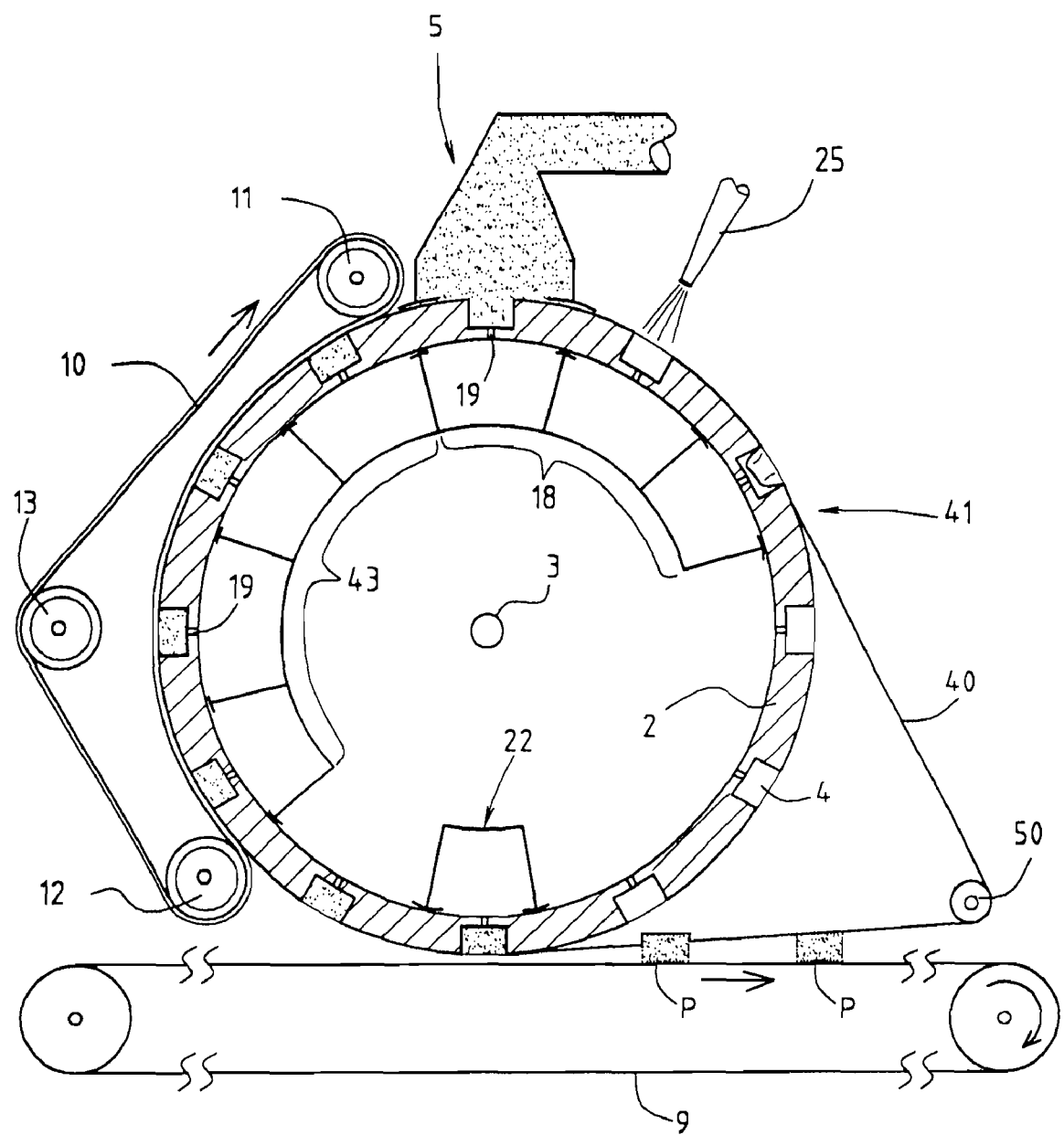
FIG. 8 shows a diagrammatic cross section through an eighth exemplary embodiment of a moulding device according to the invention.

FIG. 8 shows an eighth exemplary embodiment of a moulding device according to the invention. Where components correspond to the components shown in an embodiment which has been described above, these components are denoted by the same reference numerals; reference is made to the preceding text for a description of how they function.

In FIG. 8, instead of the disposable film 17 as described with reference to FIG. 5, a belt 40 of elastically deformable (plastic) material is used, which belt bears against the outer circumference of the drum 2 from a placing position 41 upstream of the filling component 5 to the area of the removal position of the products, on the underside of the drum 2. The belt 40 is used, inter alia, to cover the base and the side walls of the cavities 4, so that these parts do not come into direct contact with the (meat) mass.

To enable the belt 40 to be moved into the mould cavities 4, the reduced-pressure tray 18 is again provided, as are the associated connecting passages 19 in the drum wall leading to the mould cavities 4. By applying reduced pressure, the belt 40 can thus be deformed so that it bears against the delimiting walls of the mould cavities 4.

Preferably, the belt 40 is of an elastic quality which is such that it restores its shape, i.e. the belt 40 is preferably designed in such a way that it returns to its original planar form when no external force, such as the vacuum, is being exerted thereon; this can be clearly seen in FIG. 8.

Preferably, the belt 40 is cleaned in the section in which this belt 40 is clear of the drum 2.

Due to the shape-restoring properties of the belt 40, it is preferable for the reduced pressure generated by the tray 18 also to act while the mould cavities 4 are being filled. The shape-restoring property of the belt 40 can also be utilized when the shaped product is being removed from the mould cavity 4, if appropriate with the assistance of a tensile force being exerted on the belt 40, which force pulls the belt 40 back into a flat state in this position. Furthermore the removal of the product from the mould cavity 4 can be assisted by pressing air between the belt 40 and the drum 2 via excess-pressure tray 22.

The belt 40 can also be used to control the fixing pressure in the mould cavities 4 in the path between the filling component 5 and the ejection position. For example, the reduced pressure between the belt 40 and the drum 2 can be partially or completely eliminated in that path; it is even possible to produce an excess pressure, for example by means of the tray 43, which is of similar design to the trays 18 and 22 and may be divided into a plurality of compartments with separately adjustable pressures by means of partitions.

As an alternative to the trays 18, 22 and 43 shown in FIG. 8, it is also possible for the connecting passages 19 which lead to the mould cavities 4 and connect these mould cavities 4 to an excess-pressure source or a reduced-pressure source or atmosphere as desired to be designed in a different way. By way of example, these connecting passages 19 may be coupled via rotatable couplings to excess-pressure and/or reduced-pressure pipes or vent pipes which are positioned on the axis of rotation of the drum 2. The connecting passages 19 could also lead, in or along the drum wall, to one or both ends of the drum, where they could be connected to stationary lines leading to the abovementioned sources or to atmosphere, as is known, for example, from U.S. Pat. No. 4,212,609.

It will be clear that a combination of the devices shown in FIGS. 8 and 7 is possible, as is a combination of the devices shown in FIGS. 8 and 5, thus preventing contamination of the belt 40.

At the location of the ejector tray 22, the discharge belt 9 runs past the drum 2 at a short distance therefrom, so that the product comes into contact with the belt 9 while it is still largely inside the mould cavity 4. In this case, the belt 9 is driven at the same speed as the drum 2. The downstream section of the belt 40 gradually runs away from the discharge belt 9, so that the product p is released from the belt 40 and stands on the belt 9. At the end of this section of belt 40 there is a roller 50 of small diameter, so that the belt 40 runs through an acute angle and is thus pulled off the product p.

Depending on the composition of the mass which is to be moulded, it will also be possible to use the device shown in FIG. 8 without the presence of the belt 40 or a film with similar function, as explained with reference to FIG. 5. In order, in such a case, to make it possible to realise the fixing pressure by means of gas pressure and/or to eject the moulded product, it is possible to provide for the base of the mould cavity to be covered with a "sealed" layer by means of a suitable feed apparatus upstream of the filling component. This layer could, for example, be a disc of solid material, for example paper or an edible material such as a pastry product, but could also, for example, comprise a liquid which sets, for example fat, which is then introduced into the mould cavity and solidifies to form an impenetrable layer. Thus, this layer in fact functions as a "plunger" in the mould cavity.

When ejecting the product from the mould cavity, it may be advantageous to cool the product on the outside, for example by carrying out the ejecting operation using gaseous nitrogen. The cooling leads, inter alia, to shrinkage of the product, and consequently it will often come out of the mould cavity more easily.

The main concept of the invention will now be explained in more detail with reference to the device shown in FIG. 8, which concept relates to the control of the important technological perimeters associated with the moulding process.

By means of the filling component 5, a mould cavity 4 is completely filled with the (meat) mass which is fed to the filling component 5, for example via an extruder or a pump. In the process, the mass is subjected to a filling pressure, so that the mass flows into the mould cavity 4. The mould cavity 4 is preferably filled using a filling pressure which is uniform over time and is preferably low. If appropriate, additional filling-pressure control means may be provided, which seek to keep the pressure in the chamber of the filling component at a virtually constant level.

When the mould cavity 4 is full, the mass contained therein is still subject to the filling pressure, the duration of which is dependent on the speed of the drum 2 and the length of the opening of the filling component 5, measured in the circumferential direction. If appropriate, this length is adjustable in order to be able to regulate the filling period.

After filling, the mould cavity 4 is closed off by means of the belt 10, which belt 10 extends over part of the circumference of the drum 2. The combination of the length of that part of the circumference and the rotational speed of the drum leads to a maximum duration of the fixing period during which the mould cavities are closed off and a fixing pressure can be exerted on the mass contained therein. By then introducing pressurized gas or liquid beneath the belt 40 via the connecting passages 19, the mass which is present in the closed mould cavities 4 is subjected to a fixing pressure, so that the pieces which form the mass adhere to one another. In the device shown in FIG. 8, the actual duration of the fixing period may, for example, be set by separately regulating the feed of gas or liquid to each of the compartments of the tray 43; thus, it is conceivable, for example, for as yet no pressurized liquid or gas to be fed to that compartment of the tray 43 which is located immediately downstream of the tray 18.

In a variant which is not shown, the device allows the length over which the belt 10 covers the drum to be adjusted, for example by moving the rollers 12 and 13, so that in this way too it is possible to adjust the duration of the fixing period without having any effect on the duration of the filling period.

It will be clear that the device shown can be used to manipulate the filling pressure and fixing pressure, as well as the duration of the filling period and of the fixing period, and furthermore also the transition from the filling period to the fixing period as desired, in order to obtain an optimum result for the mass which is to be processed.

Figure 8A:
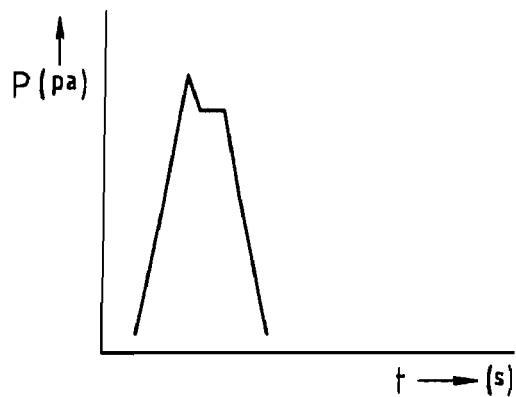
FIGS. 8a-g show examples illustrating the filling pressure and the fixing pressure in possible embodiments of the method according to the invention.
Figure 8B:
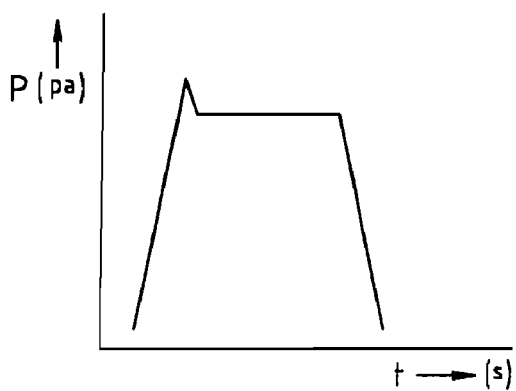
Figure 8C:
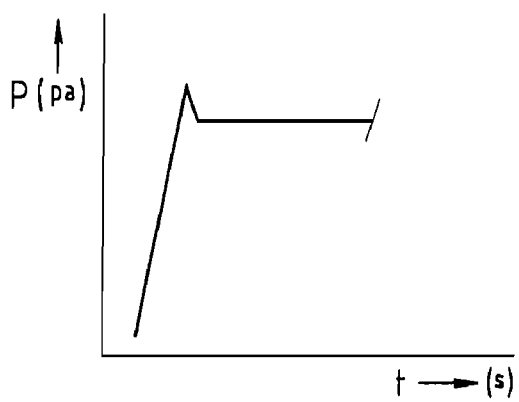
Figure 8D:
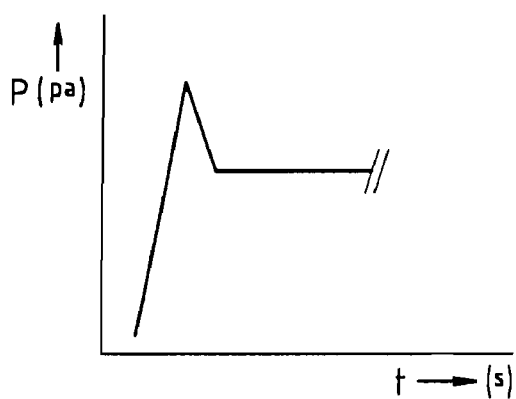
Figure 8E:
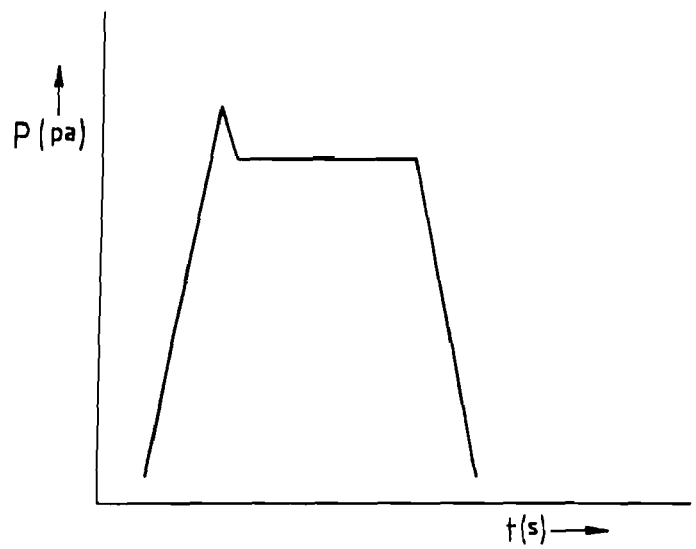
Figure 8F:
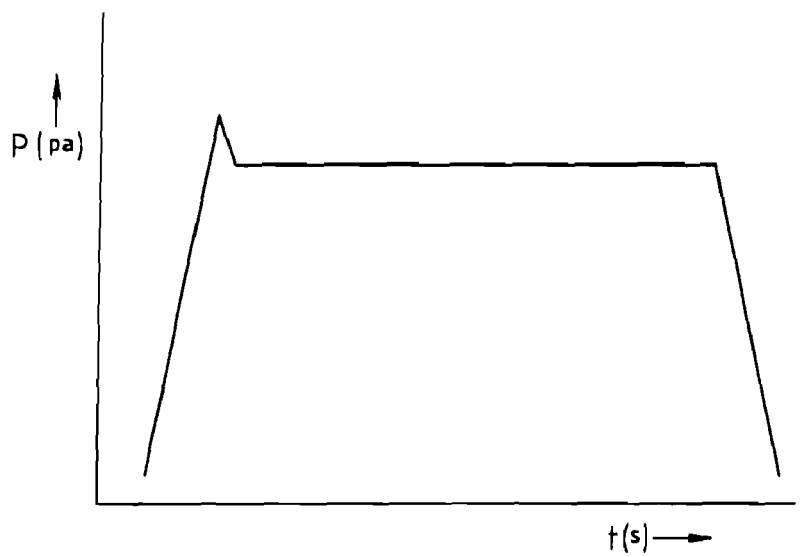
Figure 8G:
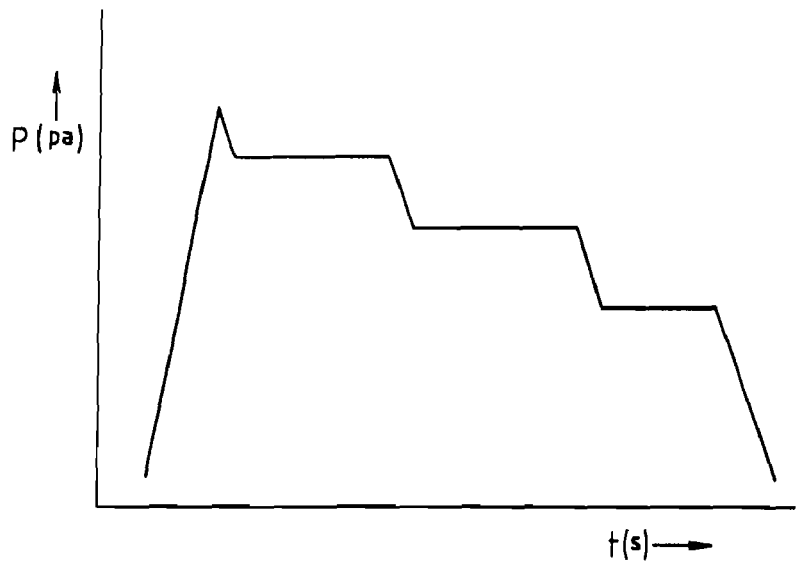

FIGS. 8a-d show four possible variants for the filling-pressure curve over time, and FIGS. 8e-g show three possible variants for the profile of the fixing pressure over time, it being clear that in the actual process the fixing pressure follows the filling pressure which has previously been exerted and in principle any desired combination is possible. It should be noted that the profiles shown are only examples and that the process can be adjusted optimally for each mass, for example on the basis of tests carried out using the mass which is to be processed.

In FIG. 8a, the filling pressure is completely eliminated after the mould cavity has been filled; this may, for example, be achieved by bringing the filling opening of the mould cavity into contact with the atmosphere.

In FIG. 8b, the filling pressure is maintained for a longer time than in FIG. 8a, for example by extending the distance over which the moving mould cavity is moving past the filling component or by lowering the speed at which it moves past. The filling pressure then falls to atmospheric pressure.

In FIG. 8c, the filling pressure is maintained without falling to atmospheric pressure, after which a higher fixing pressure can be exerted on the mass.

In FIG. 8d, the filling pressure falls slightly at the end of the filling period, but not to atmospheric pressure.

In FIG. 8e, the fixing pressure is only maintained for a short fixing time. In this case, the fixing pressure will usually be higher than the filling pressure which has previously been exerted.

In FIG. 8f, the fixing pressure is maintained for a longer time. In this case too, the fixing pressure will usually be higher than the filling pressure, but since both the duration of the fixing period and the fixing pressure are parameters, it is also conceivable for the fixing pressure, for example temporarily, to be lower than the filling pressure.

FIG. 8g shows how the fixing pressure can be varied during the fixing period, for example can be reduced in steps. To avoid the possibility of the mass which is still under pressure expanding when the mould cavity is opened, directly at the location where the opening forms, it may be advantageous to reduce the fixing pressure in the final phase of the fixing period to atmospheric pressure or even to below this pressure.

It will be clear that the fixing pressure may also have an entirely different profile, for example may initially rise and then fall again.

Figure 9:
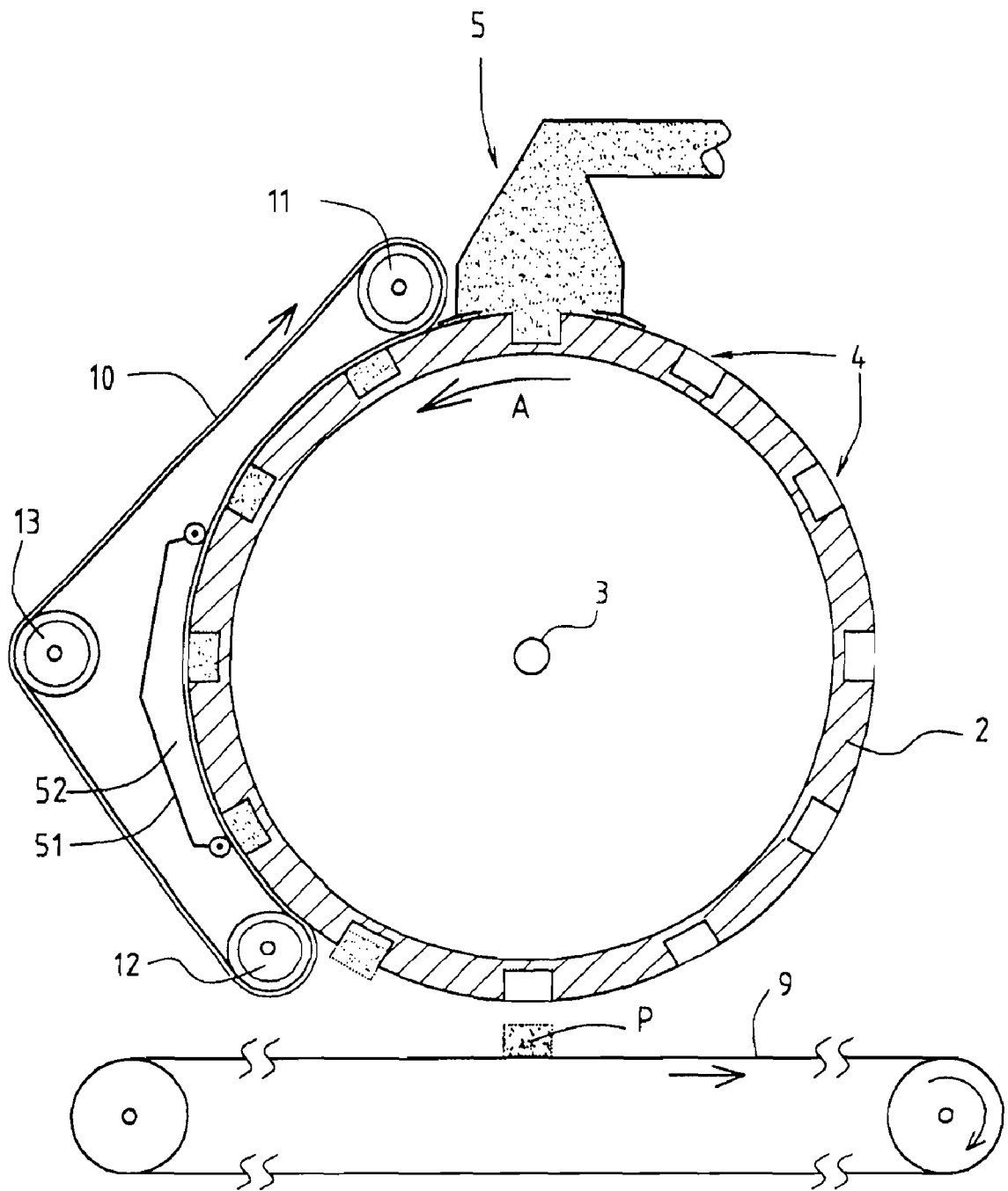
FIG. 9 shows a diagrammatic cross section through a ninth exemplary embodiment of a moulding device according to the invention.

FIG. 9 shows a ninth exemplary embodiment of a moulding device according to the invention. Where components correspond to the components in accordance with an embodiment which has been described above, these components are denoted by the same reference numerals; reference is made to the preceding text for an explanation of how they function.

In FIG. 9, the fixing pressure is regulated in the path between the filling component 5 and the removal position by regulating the pressure with which the belt 10 is pressed against the meat portions accommodated in the mould cavities 4. To this end, a controllable pressure, for example an air pressure or a liquid pressure, is preferably exerted on that side of that part of the belt 10 which bears against the drum 2 which is remote from the drum 2. In this case, this is achieved by placing a closed tray 51 against the belt on that side, which tray forms a chamber 52, one side of which is delimited by the belt 10. By connecting the tray 51 to a suitable source of pressurized medium, for example an air compressor, the pressure in the space formed by the tray 51 and the belt 10 can be adjusted, and thus the pressure with which the belt 10 presses against the portions of meat in the mould cavities 4 can be regulated.

Obviously, it is conceivable to divide the tray 51, by means of one or more partitions, into compartments which preferably form pressure compartments which lie one behind the other in the direction of rotation of the drum 2, so that different fixing pressures can be implemented at different moments during the fixing period of the product.

It will be clear that the measure in accordance with FIG. 9 can be combined with preceding exemplary embodiments.

The belt 10 may be provided with a profile on the outside, in such a manner that this profile forms a complementary pattern on the outside of the products, for example a studded, ribbed or grid profile.

In order to provide the outside of the product with the appearance of having been grilled on a grate, it is also possible to provide a heated stamp with a suitable pattern along the drum 2, which stamp is pressed against the products which are still enclosed in the mould cavities 4. Obviously, this feature can also be provided in the device shown in FIG. 8.

Figure 10:
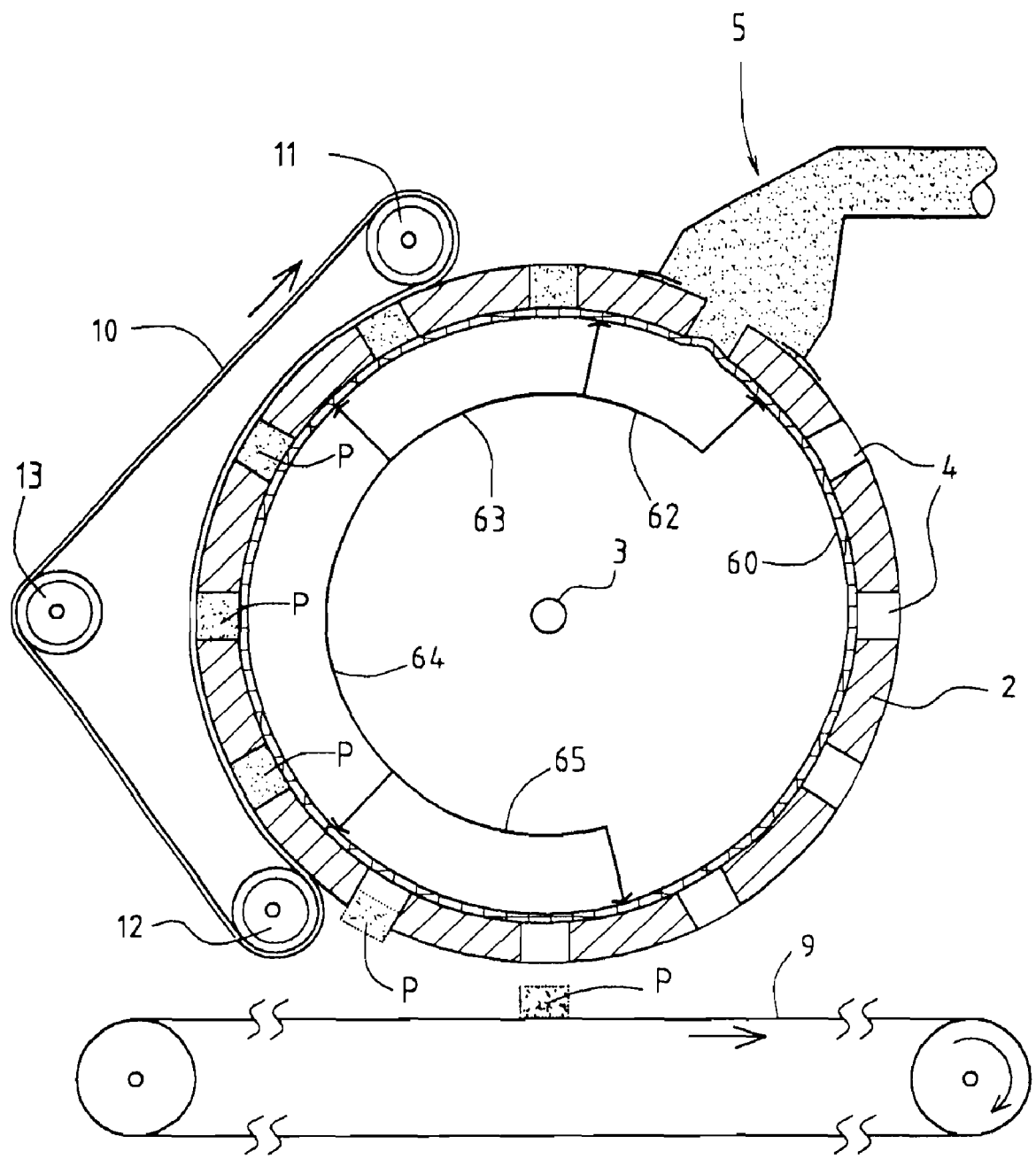
FIG. 10 shows a diagrammatic cross section through a tenth exemplary embodiment of a moulding device according to the invention.

FIG. 10 shows a tenth exemplary embodiment of a moulding device according to the invention. Where components correspond to the components shown in an embodiment described above, these components are denoted by the same reference numerals; reference is made to the preceding text for an explanation of how they function.

In FIG. 10, the bases of the mould cavities 4 are designed in the form of a flexible membrane, which in this case is achieved by designing the mould cavities 4 as openings which run all the way through the wall of the drum 2 and by covering the inside of the drum wall with a cylindrical membrane 60. At the filling component 5, an excess hydrostatic pressure is exerted on the inside of the membrane 60, in such a manner that the membranes 60 yields outwards and projects partially into the mould cavity 4. In this case, the excess pressure is produced using an excess-pressure tray 62. The filling component 5 then introduces a portion of meat into the mould cavity 4, this portion in fact being smaller than the actual volume of the mould cavity.

After the mould cavities 4 have been filled, i.e. downstream of the filling component 5, the excess pressure on the inside of the membrane 60 is eliminated and, if appropriate, a reduced pressure is generated using reduced-pressure tray 63. As a result, the base of the mould cavity 4 moves inwards. This inwardly directed movement of the base of the mould cavity 4 is intended to compensate for the expansion of the portion of meat, which expansion occurs as soon as pressure is no longer being exerted on the portion of meat on the outside of the drum 2. The elasticity of the meat mass, which is partially caused by the air which is present in the meat mass, would otherwise lead to the meat moving out of the mould cavity 4 on the outside and forming a "head" which projects outside the circumference of the drum 2. By moving the base inwards, this expansion is able to take place without the said head being formed, and it is possible that a hollow may even form in the outside of the portion of meat in the mould cavity 4. The absence of the head prevents the said head from being spread out as a result of coming into contact with the belt 10, which would result in the loss of meat material and rapid contamination of the moulding machine. If appropriate, the base of the mould cavity is not moved outwards before the mould cavity is filled, and the above-described compensation for the expansion of the mass takes place entirely by moving the base inwards.

As soon as the belt 10 lies over the outer opening of the mould cavity 4, the fixing pressure can be generated in the mould cavity, which is then closed on all sides. This may, for example, be achieved by exerting an excess pressure on the inside of the membrane 60 with the aid of excess-pressure tray 64. Also, if appropriate in combination with the above, an excess pressure could be exerted on the outside of the belt 10, as described with reference to FIG. 5. Excess-pressure tray 65 could assist with ejection of the product.

It will be clear that the concept described with reference to FIG. 10 of moving the base of the mould cavity into an outer position prior to or during filling of the mould cavity and then moving it into an inner position after the mould cavity has been filled and before the belt or a fixed closure member which bears against the outside of the drum is reached, closing off the mould cavity on that side, can also be implemented in moulding machines with a mould-cavity base which is inherently rigid and can be moved by appropriate displacement means. This inwards movement prevents a head of meat mass projecting from the uncovered outer side of the mould cavity and being spread out by contact with the closure component. After the mould cavity has been covered by the closure component, the base of the mould cavity can be moved outwards again, if appropriate in order to produce the desired fixing pressure by means of the position of the base. Furthermore, it will be clear that this concept can be applied to all types of moulding machines with mould cavities which move past a filling component, i.e. not only rotating drum type machines but also slide plate machines and turret machines.

Figure 11:
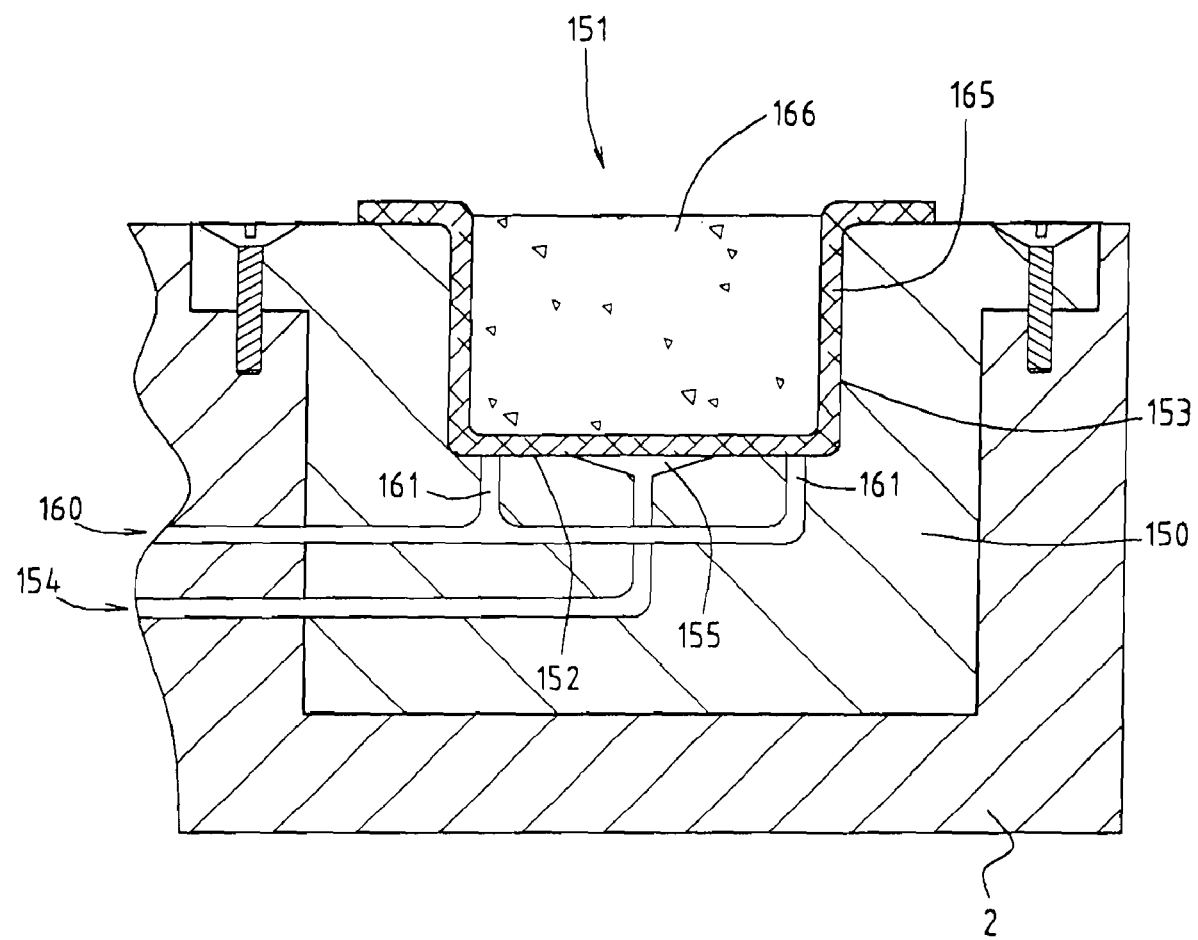
FIG. 11 shows a diagrammatic cross section through an exemplary embodiment of a mould according to the invention.

FIG. 11 shows a cross section through part of a moulding machine, the rest of which is not shown, for example one of the above-described moulding machine of the rotating drum type, for moulding a three-dimensionally moulded product from a mass of foodstuff which is suitable for human consumption, in particular from a mass which consists substantially of pounded (chicken) meat. The part which is shown relates to a drum 2 and a mould 150 which is fixed therein by means of bolts or other attachment means and is made, for example, from metal or rigid plastic, with a mould cavity 151 therein. The mould cavity 151 is delimited by a base 152 and a circumferential wall 153 and is open on the side lying opposite the base 152. A first passage 154, which is in communication with one or more first nozzles 155 located in the central area of the base 152, is associated with the mould 150. Furthermore, there is a second passage 160 which is in communication with one or more second nozzles 161 in the base 152. These second nozzles 161 lie in an annular area between the central area of the base, which is provided with the first nozzles, and the circumferential wall 153, or if appropriate even in the circumferential wall 153, in the vicinity of the base 152. The passages 154 and 161 can be selectively connected to a source of air or another gas under pressure or to a vacuum pump or another reduced-pressure source.

To prevent contamination of the mould 150 and to avoid adhesion between the meat mass and the mould 150, there is provision for a flexible membrane 165 to be arranged between the walls of the mould cavity and the portion of meat 166 which is to be introduced into the mould cavity 151. In this figure, the thickness of the membrane 165 is exaggerated, and the membrane may, for example, be formed by a disposable film or by the elastic belt as described above. If appropriate, the membrane 165 may form part of the mould 150 and may be fixed to the mould 150 in the vicinity of the circumferential edge of the filling opening of the mould cavity 151.

If the membrane 165 is a film as described, for example, with reference to FIG. 5, the air which is present in the mould cavity 151 after the film has been placed over the opening of the mould cavity 151 is sucked out via the first and/or second passage 154, 161, so that the film comes to lie taut against walls of the mould cavity 151. Then, if appropriate at the same time as the mould cavity 151 is evacuated, the portion of meat is introduced into the mould cavity 151.

The above-described design of the mould 150 is also important for releasing the moulded meat product from the mould cavity 151. In this case, there is provision for a pressurized medium to be fed first to the second passage 160 and thus the nozzles 161 in the vicinity of the circumferential wall 153, while no medium is being fed to the first nozzle(s) 155, or even a reduced pressure is maintained at the first nozzle 155. This ensures that the product 166 is firstly pressed outwards in the area in the vicinity of the circumferential wall of the mould cavity 151 while the product in the centre remains in position. By then feeding a pressurized medium via the first nozzle(s) 155 as well, the whole of the product 166 is removed from the mould 150 and moves uniformly upwards.

Figure 12A:
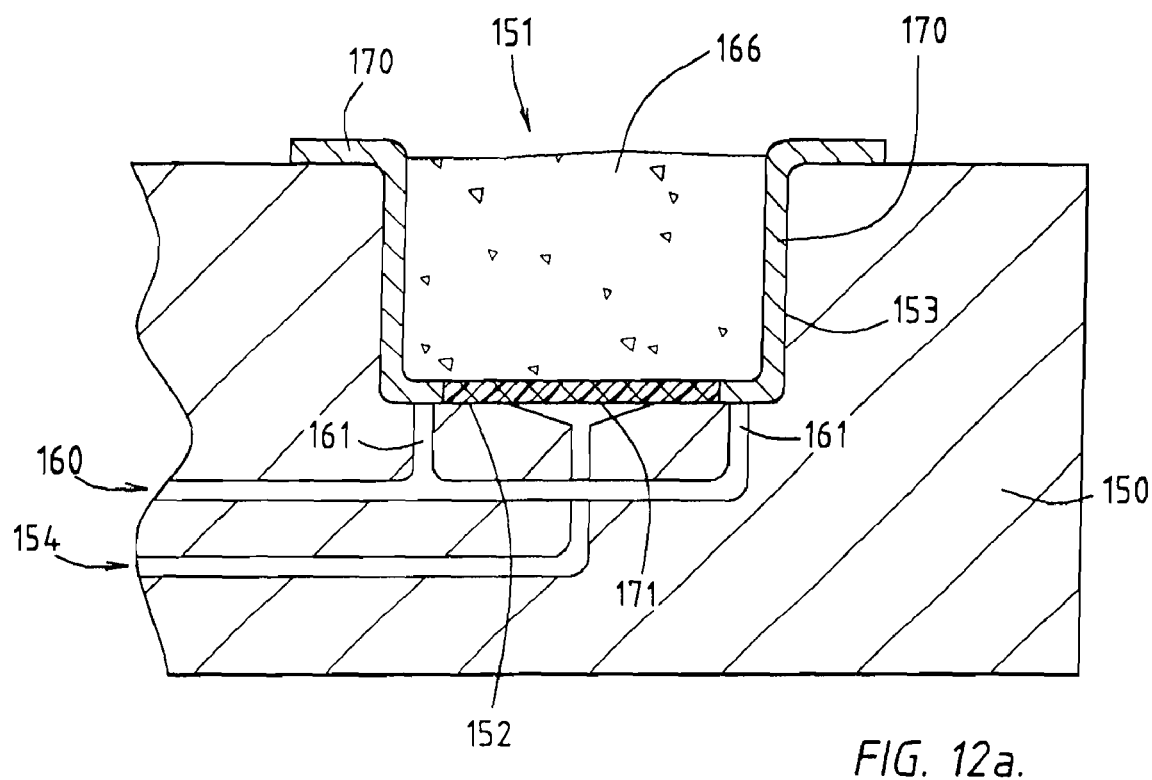
FIGS. 12a, 12b and 12c show diagrammatic cross sections through further exemplary embodiment of moulds according to the invention.

The membrane may also at the same time serve as (part of) the packaging of the moulded product; for example, it is conceivable for the membrane 170 from FIG. 12a to be placed as a loose element inside the mould and to be held in place temporarily, for example via a vacuum groove running along the circumferential wall of the mould cavity, and to remain around the product as packaging after the product has been moulded.

The inventive concept explained with reference to FIG. 11 can also be realized with a base/wall covering structure for the mould cavity as shown in FIG. 12a. In this design, the base 152 and the wall 153 of the mould cavity are covered by a covering with a flexible part 170, which covers the wall 153 and an annular area of the base 152 which adjoins the wall, and a stiffer or even hard part 171, which covers the central part of the base 152. By then supplying air via passage 160, the initial movement takes place in that part of the mass 166 which is located along the wall 153. Then, the centre of the said mass 166, which is supported by the rigid part 171, also moves out of the mould cavity 4. The rigid part may also be made of the same material as the flexible part 170 but may then be cooled and therefore be made more rigid, for example by cooling, for example using cold nitrogen.

In a variant, the rigid part 171 of the membrane is absent, and is replaced by a rigid piece of the edible product which is ultimately to be produced on the membrane.

The structure shown in FIG. 12a is particularly advantageous for exerting a fixing pressure on the mass 166, since the said mass 166 is covered on the side of the opening in the mould cavity by a suitable closure component. By then exerting air pressure via passage 154, the hard disc part 171 presses against the mass, in fact in the manner of a piston, but without the associated disadvantages.

Figure 12B:
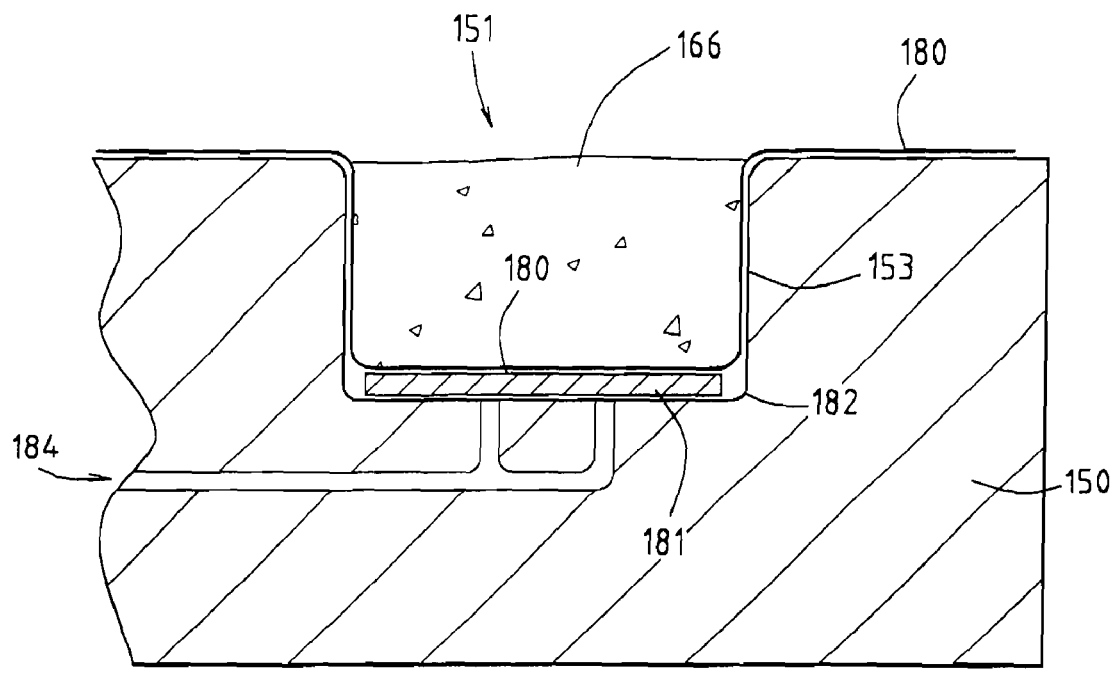

In a variant shown in FIG. 12b, the cover comprises flexible film or a flexible membrane 180, and a part of the base 152 of the mould cavity which is free of the wall 153 is designed as the end face 180 of a moveable disc-like piston 181. The annular area 182 of the base 152 around the piston 181 lies— in the retracted position of the said piston 181—further inwards than the end face 180. Nozzles of air passage 184 are present in the mould 150, below the piston 181. If the mass 166 is covered on the side opposite the piston 181 and if it is desired to exert a fixing pressure on the mass 166, air or some other gas or a liquid can be supplied under pressure, via the air passage 184, so that the piston 181 is pressed outwards and the mass is placed under pressure. If the product, after the fixing period, is no longer covered, and the moulded product is ejected, pressurized medium can again be supplied via passage 184, with the result that this pressurized medium emerges from under the piston 181 and initially presses the mass 166 outwards in the annular area, followed by the piston 181.

It will be clear that the mould designs described with reference to FIGS. 11 and 12a, 12b, 12c may also be applied to all the known and abovementioned types of (meat) moulding machines, i.e. also in machines of the slide-plate and turret type.

The abovementioned moulds are all of "self-releasing" design, so that it is not necessary to design the mould in two or more parts which have to be moved apart in order to remove the moulded product from the mould. It will be clear that the inventive concept can also be applied to a mould with a mould cavity which is not of "self-releasing" design and, for example, comprises two mould halves which have to be moved apart in order for the moulded product to be released. Such moulds may also, for example, be placed around the circumference of a drum or accommodated in a turret, which will be explained in more detail with reference to FIGS. 18a and 18b.

Figure 12C:
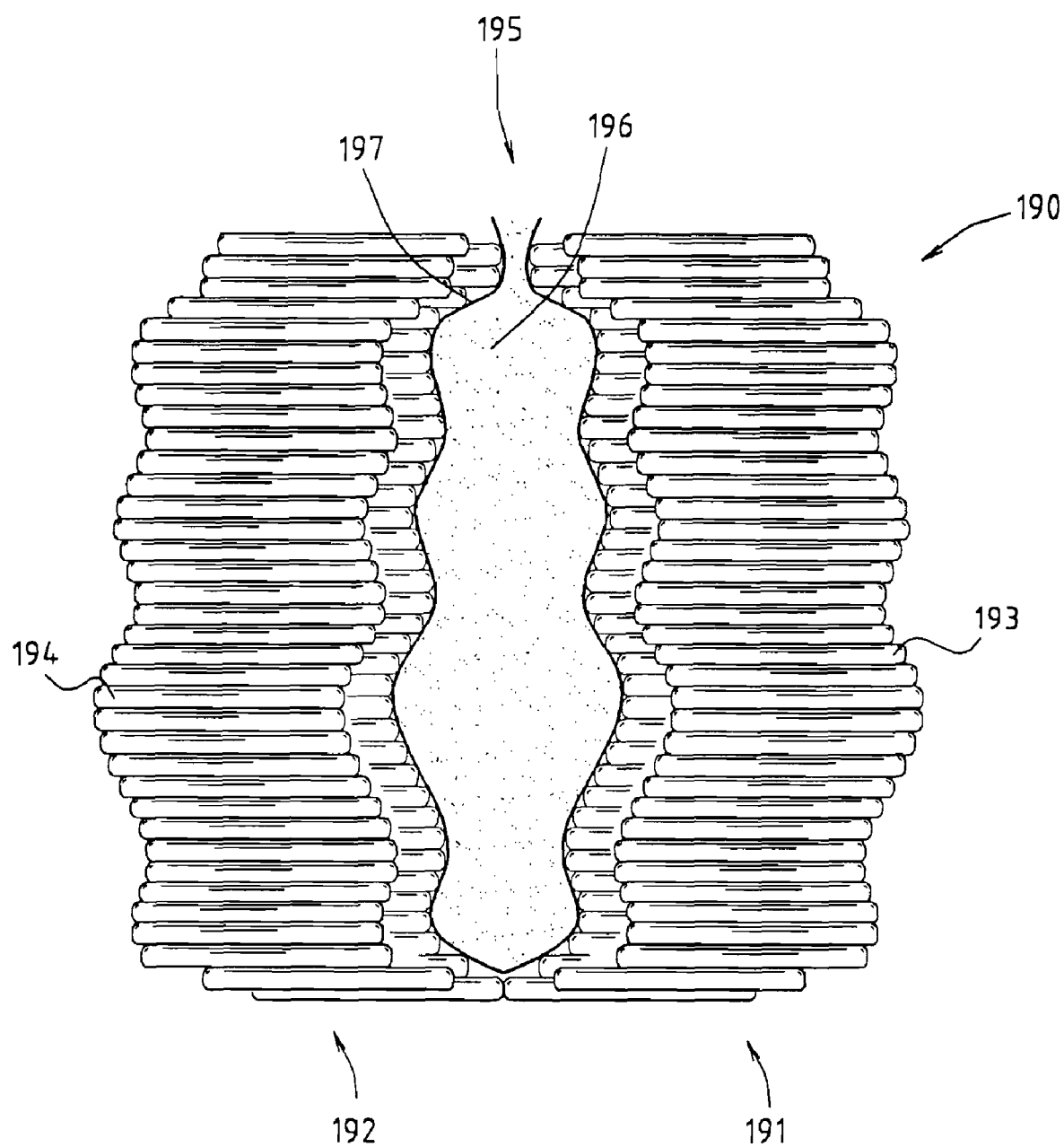

FIG. 12c shows a mould 190 of particular design which can be used to produce products which are not automatically released. The mould 190 comprises two mould halves 191 and 192, of which the mutually facing sides, which between them delimit a mould cavity 196, are at least partially defined by the heads of a large number of pins 193 and 194, respectively. The pins 193, 194 can be moved in their longitudinal direction, so that in this way the shape of the mould cavity 196 can be determined. The mould cavity 196 may be filled on the side 195 and may also be opened on that side, although release may also, if appropriate, take place on the other side. A membrane 197 lies over the heads of the pins 193, 194 and may, as described above, be a (packaging) film, for example.

The mould 190 can also be used to exert a fixing pressure after the mould cavity 196 has been filled, for example by moving the pins of one of the mould halves slightly towards the other mould half.

To provide cohesion of the pieces of meat in the mould, local heating may be provided, so that the product becomes dimensionally stable as a result of coagulation. As an alternative, it is possible to freeze the mass in the mould cavity. In the case of these thermal treatments of the mass in the mould cavities, it is deemed advantageous to arrange thermal insulation between the mould cavities. When a meat mass is heated, fat may be released, which fat may facilitate removal of the moulded product from the mould cavity.

Figure 13:
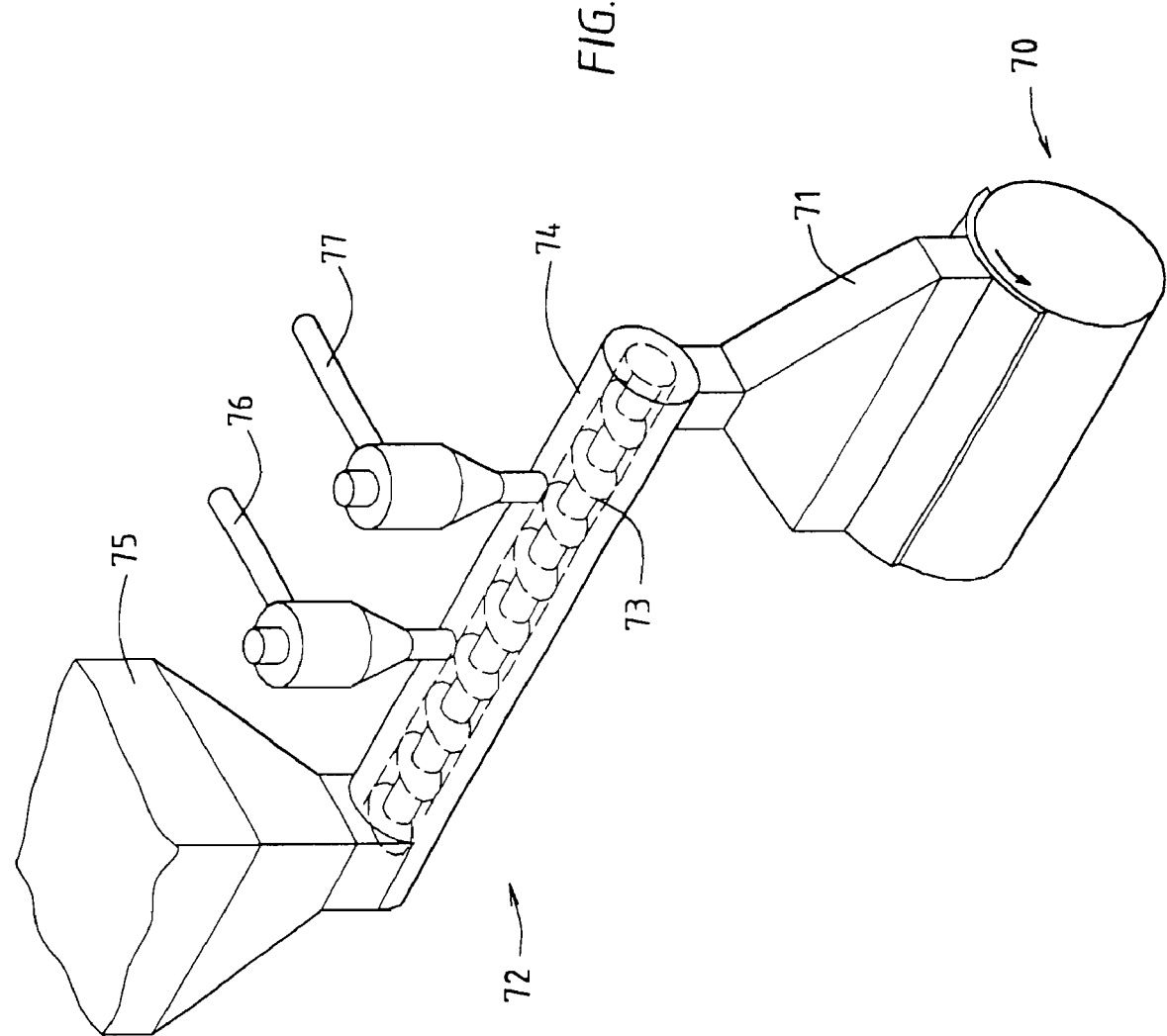
FIG. 13 shows a diagrammatic perspective view of a moulding device of the rotating drum type, possibly in accordance with one of FIGS. 4-10, in combination with an exemplary embodiment of the feed means for the mass.

FIG. 13 shows a perspective view of a moulding device 70 of the "rotating drum type", for example designed as described above with reference to FIGS. 4-10, with an associated filling component 71. To feed the meat mass to the filling component 71, an extruder 72 is provided, having an extruder screw 73 which can rotate inside an associated extruder tube 74. The extruder 72 is fed with meat from a storage container 75, which meat is pounded by the extruder 72 and is pushed towards the filling component 71. The consistency and in particular the viscosity of the meat mass coming out of the extruder 72 are of great importance for the operation of filling the mould cavities of the moulding device 70 and for forming the moulded meat products. Therefore, the invention provides for additives to be added to the meat mass in the extruder 72 when necessary, in order to alter the viscosity. Furthermore, additives may be added to the meat mass at the extruder 72, preferably by means of feed means 76, 77 which are connected to the extruder tube 74. These additives may, for example, be spices, flavourings and colorants, water, egg white, etc., but it is also conceivable for another type of meat to be added. The additives are fed to the extruder tube 74 under pressure. Preferably, the pressure of the meat mass is regulated in the chamber of the filling component 71, in such a manner that the pressure in that chamber is kept within a predetermined pressure range, for example by regulating the rotational speed of the extruder screw 73. As an alternative to an extruder screw as shown and described here, it is also conceivable to use a different type of conveying/mixing component for supplying and mixing the mass to the moulding machine. By way of example, a ribbon mixer could be used.

FIG. 14 shows a variant embodiment of the device shown in FIG. 13, with which it is possible to produce layered products. This figure, in addition to the components which are provided with the same reference numerals as those in FIG. 13, also shows a special filling component 141 with two connections, one for the extruder 72 and one for a second extruder 142, which is only shown in part. In the filling component 141, each connection is adjoined by an associated system of passages which has branching passages which divide the streams of pounded foodstuff emerging from the extruders 72 and 142 into sub-streams. The passages of each system of passages each end at an associated outlet nozzle. By suitably designing the filling component 141 it is possible, for example, to supply a plurality of alternating, adjacent substreams of different masses at the location where the mould cavity moves past the filling component 141 and to place these different masses into the mould cavity. In this way, it is possible, for example, for a product p to comprise a middle strip 145 of a foodstuff delivered by extruder 72 and two outer strips 146, 147 of a foodstuff delivered by extruder 142. The strips 145-147 adjoin one another transversely with respect to the direction of rotation of the drum 70. Obviously, a product may be composed of even more strips and/or even more extruders could be connected to the filling component 141.

It will be clear that if the mould cavities of the drum have their filling opening on the inside, the filling component 141 may also bear against the drum on the inside.

Figure 15A:
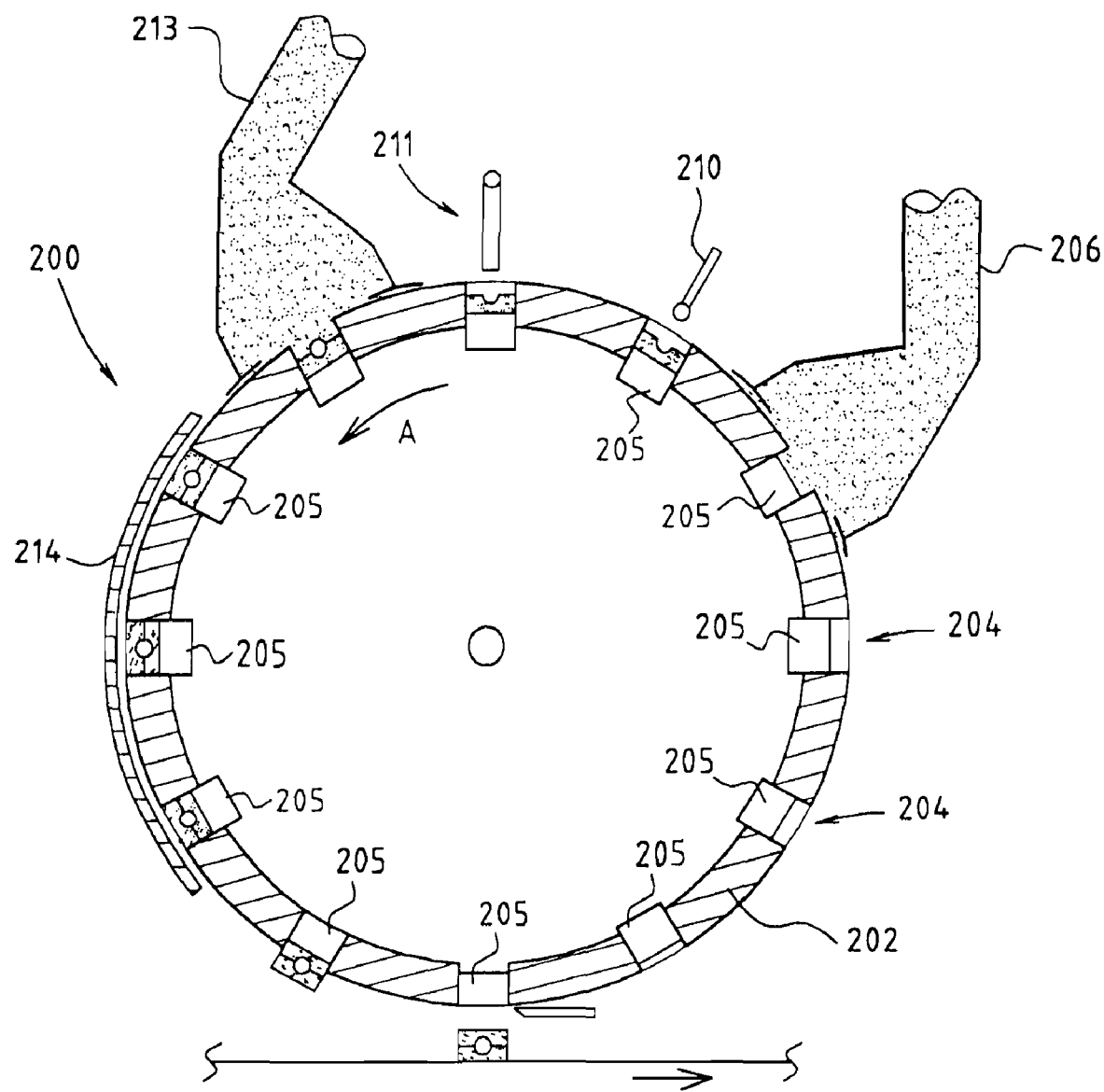
FIG. 15a shows a diagrammatic, vertical section through an eleventh exemplary embodiment of a moulding device according to the invention.

FIG. 15a shows a variant embodiment of the device according to the invention which makes it possible to produce a product with an internal filling, for example a chicken product with an internal filling of sauce, and/or a layered product.

The device 200 has a rotatable drum 202 with mould cavities 204, the base 205 of which is able to move inwards and outwards, for example by forming the base as a piston which can be moved to and fro. The device 200 comprises a first filling component 206 which, as seen in the direction of rotation of the drum 202, is in this case located upstream of the highest point of the path of the drum 202. On reaching the first filling component 206, the base 205 of the corresponding mould cavity 204 is in a position which is located towards the outside with respect to the final thickness of the product which is to be produced. The filling component 206 is then used to fill the mould cavity 204 with a (meat) mass. Then, the base 205 moves inwards, and a hollow is pressed into the (meat) mass by a hollow-pressing component 210 which is located along the drum 202. The hollow may be of any desired form, including an annular recess. Then, a portion of filling is placed into the said hollow by means of a filling-feed component 211. The filling may be liquid, but could also be solid, for example a block of frozen sauce or an edible body. In the case of a solid piece of filling, it would be possible to dispense with the operation of forming the hollow.

After the filling has been placed in the hollow, a second layer of the meat mass is placed into the mould cavity 204 with the aid of a second filling component 213 which is located downstream of the first filling component. By introducing meat mass using the second filling component, the filling is completely enclosed between the two layers of meat mass. Furthermore, it is now possible to exert a fixing pressure on the mass in the mould cavity 204, preferably in one of the ways described above, for example at the location of closure component 214. Then, the moulded product with the internal filling can be ejected from the mould cavity 204, during which operation the base 205 is moved outwards.

It will be clear that a product composed of a plurality of layers can be formed in each moulding cavity using a device which comprises a plurality of filling components which are arranged one behind the other in the direction of rotation of the drum, with the mould cavities which move past the filling components having a moveable base, which base is then moved in a stepwise manner in order to increase the size of the mould cavity and in order to be able to accommodate a new layer of (meat) mass. This measure could also be combined with a filling component as described with reference to FIG. 14, so that various layers can be formed both in the thickness and in the width of the product.

In a variant which is not shown, no filling is introduced into the product, but rather two products which are separated from one another by a film or the like are produced in one mould cavity. This is possible by arranging a film over the outside of the mould cavity after it has moved past the first filling component 206, after which the base of the mould cavity moves inwards, and then a following product is formed on the film by means of the second filling component 213. As an alternative to film, a loose disc could also be used.

Figure 15B:
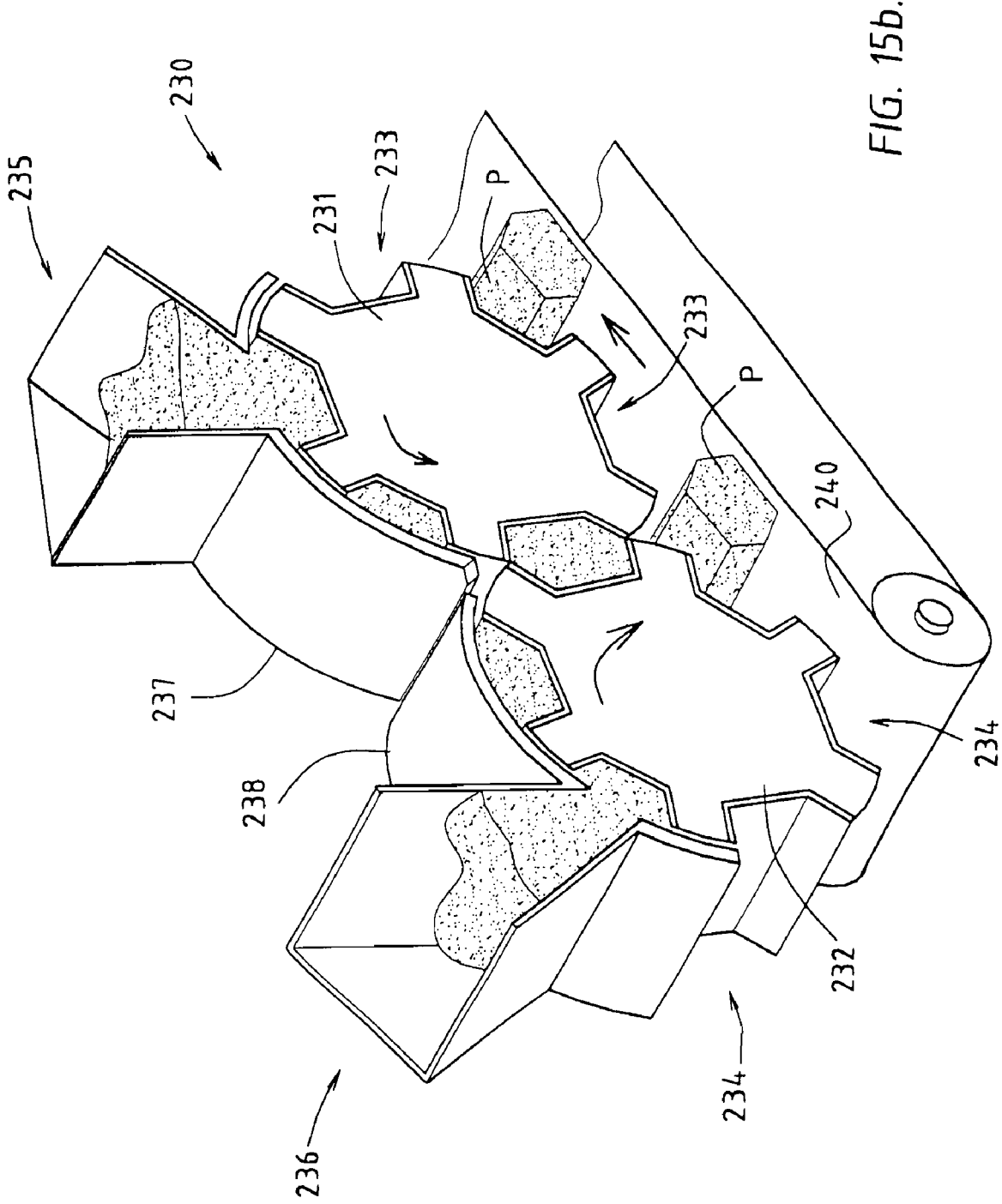
FIG. 15b shows a diagrammatic cross section through a twelfth exemplary embodiment of a moulding device according to the invention.

FIG. 15b shows a moulding device 230 with two drums, 231 and 132 respectively, which are positioned next to one another and are each provided with associated mould cavities 233 and 234 on the outer circumferential surface. The drums 231 and 232 are driven in rotation in opposite directions but at the same circumferential speed, by means of drive means (not shown). Furthermore, the cross-sectional dimensions of the openings of the mould cavities 233 and 234 are identical, so that, given a suitable arrangement of the drums 231 and 232, it is possible to make two mould cavities 233 and 234 accurately adjoin one another. In this case, the delimiting edges of these two mould cavities bear tightly against one another. To allow the drums to rotate, it is possible for one of the drums to be moved sideways to and fro with respect to the other drum during rotation. As an alternative, the delimiting edges of the mould cavities of one or both drums could be designed in such a manner that they can be compressed resiliently.

Each drum 231 and 232 has an associated filling component 235, 236, by means of which meat mass or the like can be introduced into a mould cavity. On the downstream side of each filling component 235, 236, there is an associated closure component 237, 238 with dimensions which are such that the component closes off a mould cavity at least while the mould cavity is still in communication with the filling component. In this way, a completely filled mould cavity can be obtained in both drums, with the mass in the mould cavity projecting outwards with respect to the plane running across the delimiting edges of the mould cavity. As the drums 231 and 232 rotate further, the filled mould cavities then come to lie next to one another, with the delimiting edges of these mould cavities adjoining one another in a sealed manner and thus forming a completely closed space. By means of this measure, the mass in this space is compressed with respect to the situation after it has moved past the filling component, so that by means of this compression the mass in the closed space is subjected to a fixing pressure. Obviously, it is also possible to provide additional measures for controlling the fixing pressure, for example the use of film between each of the drums and the mass which is to be fed, and the exertion of a gas pressure between the drums and the film at the time at which the two mould cavities adjoin one another.

The fixing pressure produces adhesion between the pieces of meat, after which the meat product p can be removed as a cohesive unit and can be discharged via conveyor device 240.

It will be clear that the device 230, instead of having drums 231 and 232, may also be produced with two turrets which run past one another, in which case, for example, the path over which the mould cavities adjoin one another, and therefore over which the fixing pressure prevails, can be extended further.

FIGS. 16a and 16b and 17a-h show an alternative moulding device for producing three-dimensional products from foodstuff. This device comprises a stationary central tube 310 which is preferably arranged at the end of an extruder 302, as can be seen from FIG. 16b. In the central tube 301 there is an opening 303, through which (meat) mass which has been fed via the interior of the tube 301 can move out of the tube 301. A ring 305 which can be driven in rotation and is coupled to a drive motor, for example by means of a gear wheel/gear ring transmission 306, lies around the outside of the tube 301.

The ring 305, together with the tube 301 which fits inside it, forms two substantially C-shaped chambers 308 and 309 which are located around the tube 301. These chambers 308, 309 each have an associated outlet 310, 311, respectively, leading to the outside of the ring 305. A stationary cylindrical outer casing 312 with a single opening 313, which may be aligned with a matching outlet 310, 311, fits around the outside of the rotatable ring 305. The outer casing 312 is arranged eccentrically with respect to the tube 301.

The chambers 308 and 309 are separated from one another by inwardly projecting lobes 314, 315 on the ring 305, which lobes are designed in such a way that, in the event of rotation of the ring 305, they continue to bear in a sealing manner against the tube 310.

The opening 303 and the opening 313 are arranged in such a way that, in the event of rotation of the ring 305, they temporarily come into communication with the same chamber 308 or 309.

Figure 17A:
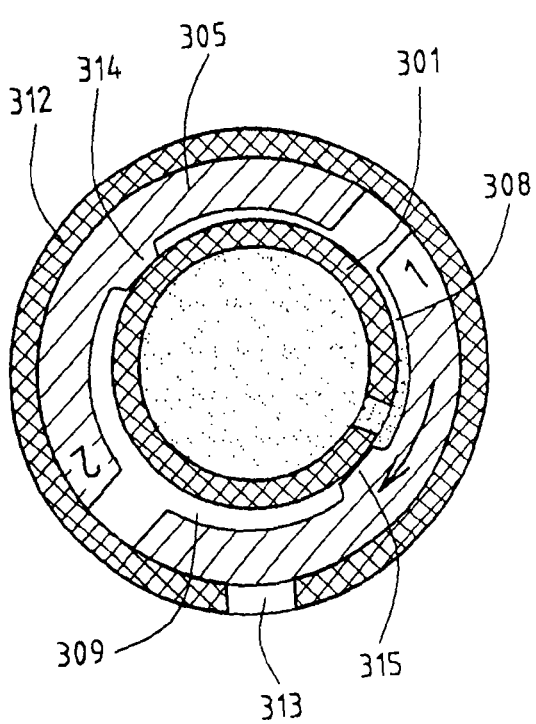
FIGS. 17a-h show diagrammatic cross sections, in various positions, through the moulding device shown in FIGS. 16a and 16b, and FIGS. 18a and 18b show diagrammatic perspective views of a fourteenth exemplary embodiment of a moulding device according to the invention.
Figure 17B:
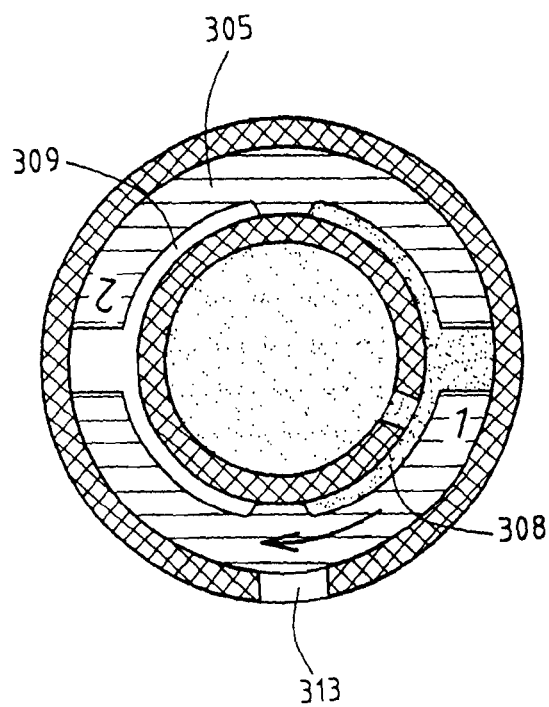
Figure 17C:
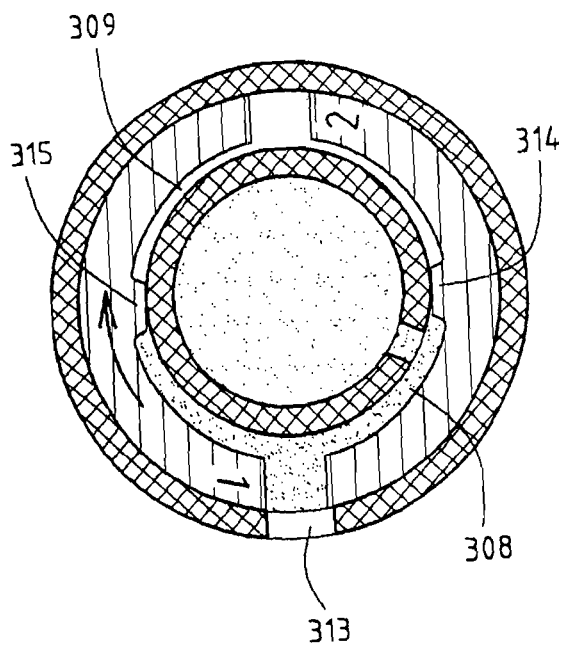
Figure 17D:
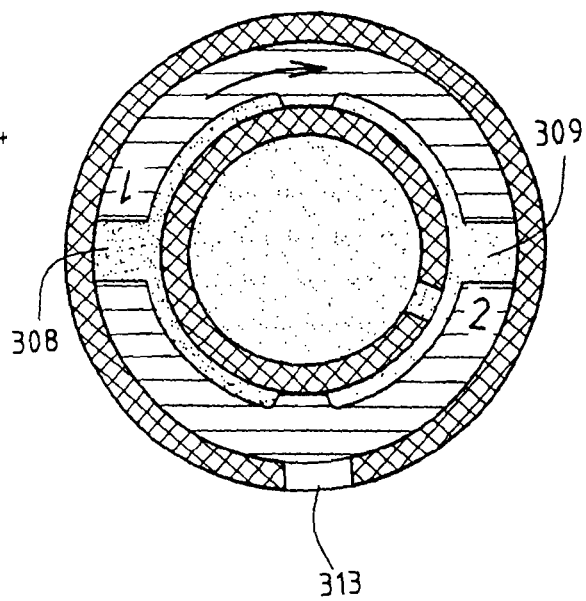
Figure 17E:
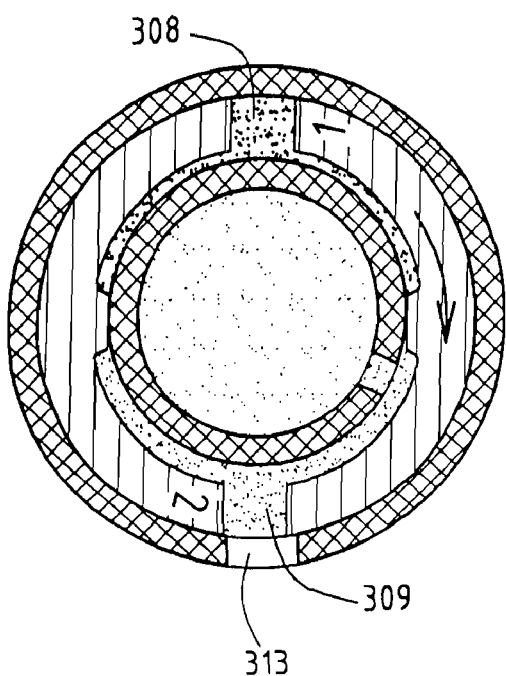
Figure 17F:
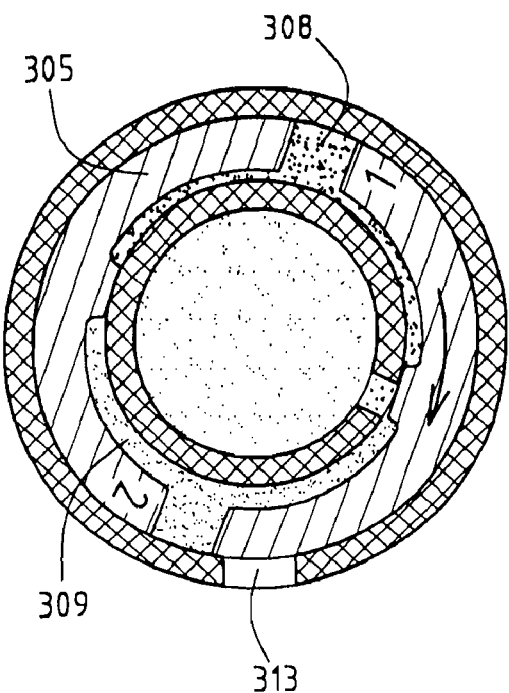
Figure 17G:
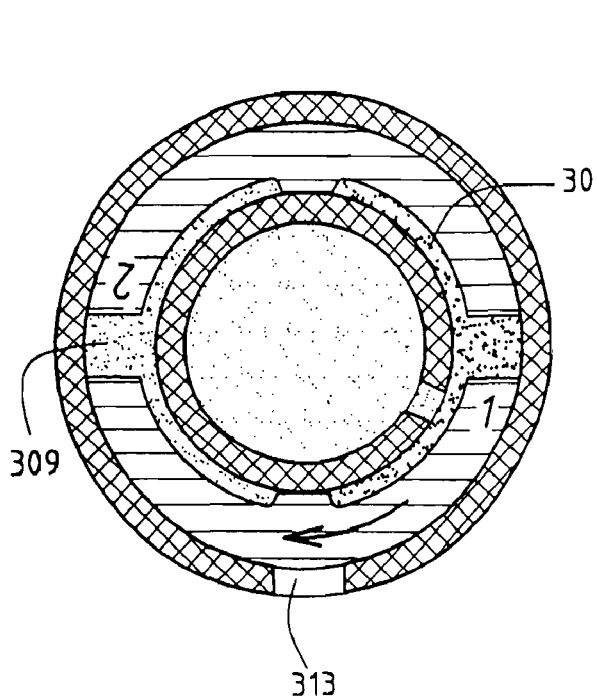
Figure 17H:
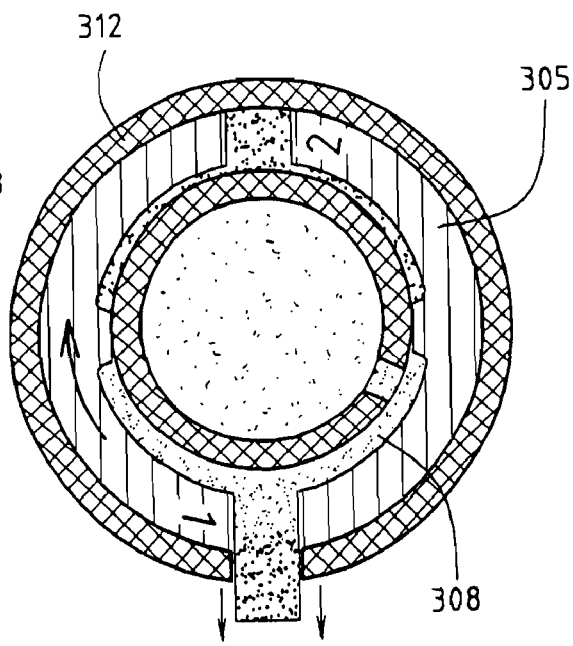

This device operates as follows. When the device starts up, the chamber 308 will be filled via opening 303, this operation taking place for as long as this chamber is in communication with the opening 303 (cf. FIGS. 17a-17c). Then, the volume of the chamber 308 becomes ever smaller as a result of the eccentric arrangement of the ring 305 with respect to the tube 301, until a minimum volume is reached (FIG. 17e). As a result of this reduction in volume, the mass in the chamber 308 is compressed by a pressure which is independent of the pressure with which the mass has been introduced into the chamber 308 via the opening 303. When the ring 305 rotates further, the volume of the chamber 308 increases again and, as soon as the chamber 308 reaches the opening 303 again, further mass will enter the chamber 308 adding to the already compressed mass (FIG. 17g). As soon as the outlet of the chamber 308 then reaches the opening 313 in the outer casing 312 (FIG. 17h), at that moment mass which flows in via the opening 303 presses a portion of the already compressed mass outwards via the outlet. It will be clear that the same process takes place in chamber 309.

To regulate the pressure with which the mass is compressed, it is possible for the device to be designed in such a manner that the eccentricity can be adjusted within a defined range.

Figure 18A:
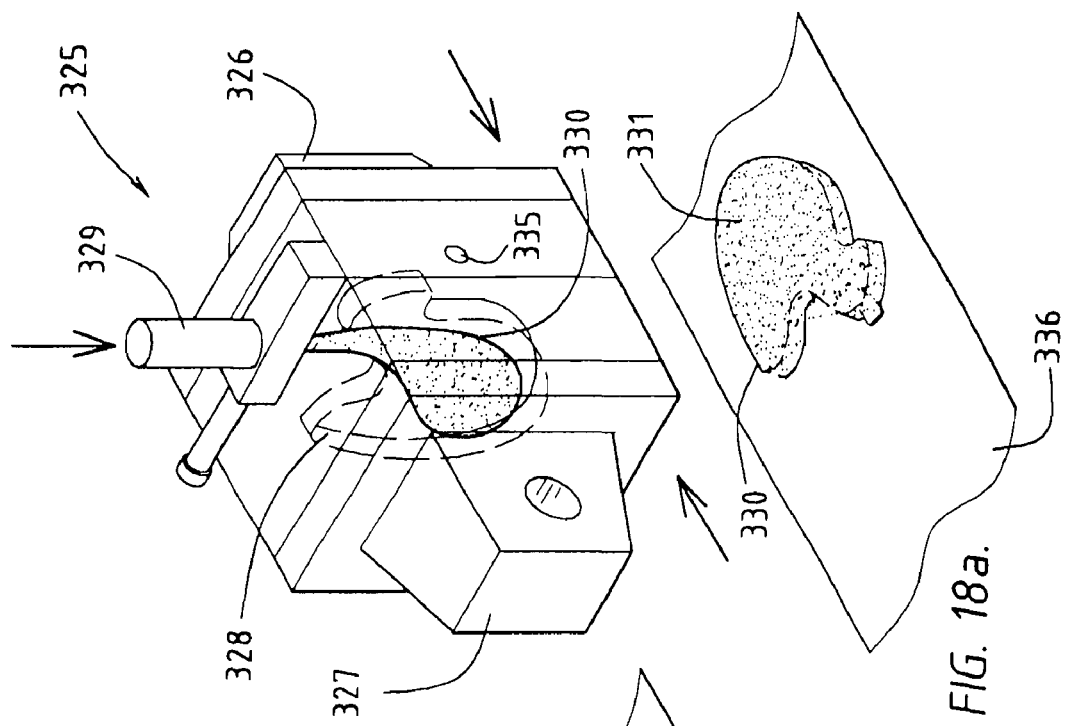
Figure 18B:
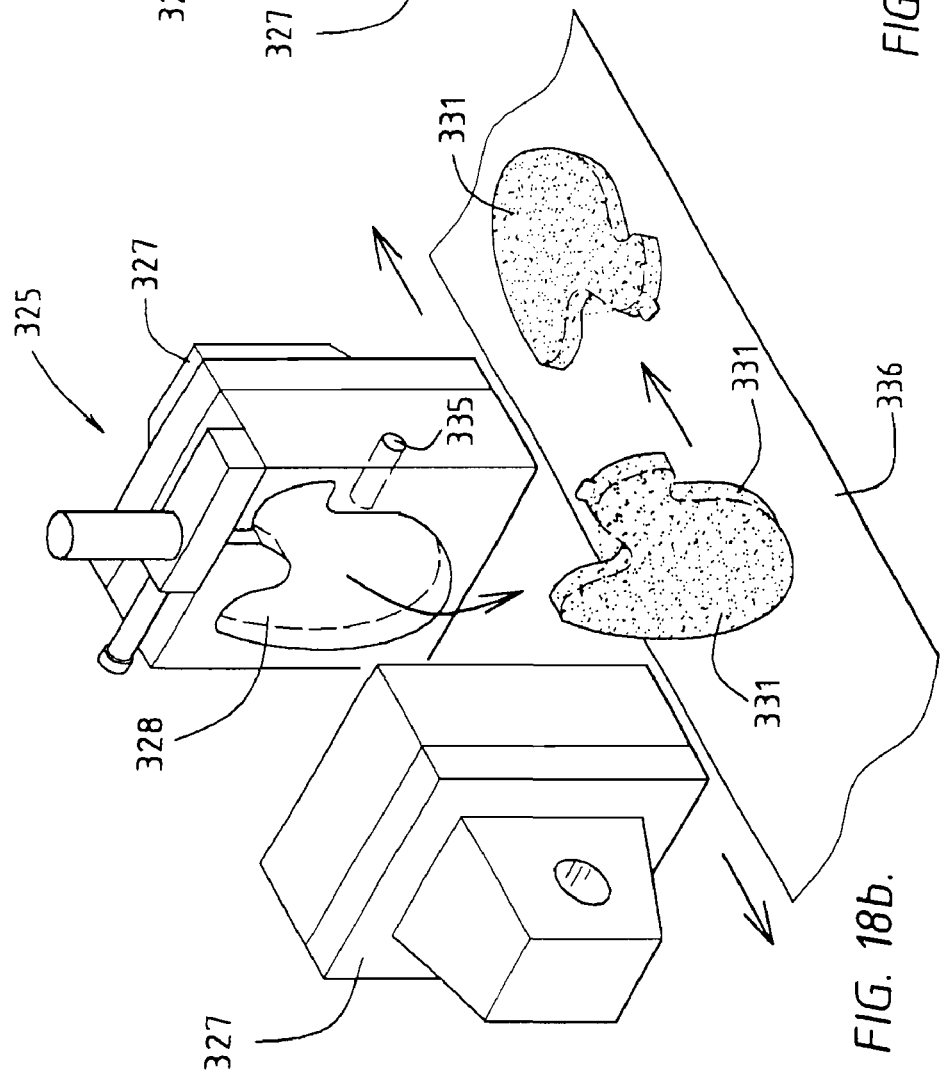

FIGS. 18a and 18b show an embodiment of a moulding device 325 according to the invention in which a mould comprises two mould halves 326 and 327 which can move with respect to one another. The two mould halves 326 and 327 may, for example, be accommodated in a turret which transports the mould halves along a path. In this case, the design may, for example, be such that, in a bend in the path, the two mould halves 326 and 327 are moved away from one another, as in FIG. 18b, and in a straight part of the path bear against one another, so that the mould 328 is then closed.

The mould half 326 is provided with a feed tube 329 for feeding the (meat) mass to the mould cavity 328. In this case, however, in the open position of the mould, a balloon-like membrane 330 is placed in the mould, with its opening connected to the feed tube 329, so that the mass moves into the balloon 330. The balloon 330 is preferably made from an elastic plastic material, preferably of a quality which is such that the balloon can be used directly as a packaging material for the moulded products 331.

After the mould has been closed, mass is then introduced into the balloon 330, so that this balloon adopts the shape of the mould cavity 328. After the filling has finished, the balloon already exerts a fixing pressure on the mass, but preferably additional measures are provided in order to produce a controllable fixing pressure. For example, a pressure medium can be placed between the mould and the balloon 330 via connecting passage 335, the pressure of which medium can be regulated in order to control the fixing pressure.

When the fixing period has expired, the mould can be opened and the moulded product 331, which is packaged inside the balloon 330, can be removed and discharged using discharge means 336.

The method according to the invention is described in claims 1-5, and a number of moulding devices which are suitable for implementing this method are described in the following claims. However, the present invention also relates in part to the moulding devices themselves, independently of the method according to claims 1-5, a fact which could be represented by replacing the current wording "moulding device for carrying out the method according to one of claims 1" by "Moulding device for moulding three-dimensional products from a mass of foodstuff which is suitable for human consumption". Furthermore, it will clear that the present description, with reference to various figures, mentions numerous aspects which can be combined by the person skilled in the art and may, for example, be implemented in a single moulding device. It will be clear that the present application also relates to such combinations and devices.

What is claimed is:

1. A method for molding three dimensional products from a mass of foodstuff which is suitable for human consumption using a molding device comprising:
   a mold comprising a mold cavity defined by a base and a circumferential wall and having a cavity opening opposite the base;
   a mass feed component;
   one or more first nozzles located in the base of the mold cavity;
   a first passage in communication with the one or more first nozzles;
   one or more second nozzles located in the circumferential wall or in an annular area of the base adjacent the circumferential wall;
   a second passage in communication with the one or more second nozzles;
   a source for gas under pressure; and
   a selector device for selectively connecting the source to the first passage or the second passage,
the method comprising:
   feeding the mass of foodstuff into the mold cavity via the cavity opening with the mass feed component;
   molding the mass of foodstuff into a molded product; and
   removing the molded product from the mold cavity by first bringing the second passage into communication with the source of gas under pressure, so that the molded product is pressed away from the circumferential wall of the mold cavity, and then bringing the first passage into communication with the source of gas under pressure, so that the molded product is removed from the mold cavity.

* * * * *